(12) United States Patent
Neuman et al.

(10) Patent No.: US 11,029,519 B2
(45) Date of Patent: Jun. 8, 2021

(54) ANTIREFLECTION COATINGS

(71) Applicant: Gentex Corporation, Zeeland, MI (US)

(72) Inventors: George A. Neuman, Holland, MI (US); Mario F. Saenger Nayver, Zeeland, MI (US); John S. Anderson, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/812,501

(22) Filed: Mar. 9, 2020

(65) Prior Publication Data
US 2020/0209621 A1 Jul. 2, 2020

Related U.S. Application Data

(62) Division of application No. 15/788,939, filed on Oct. 20, 2017, now Pat. No. 10,591,724.

(60) Provisional application No. 62/410,913, filed on Oct. 21, 2016.

(51) Int. Cl.
| | | |
|---|---|---|
| *G02B 27/01* | (2006.01) | |
| *G02B 1/11* | (2015.01) | |
| *G02F 1/1335* | (2006.01) | |
| *G02B 1/113* | (2015.01) | |
| *G02F 1/157* | (2006.01) | |

(52) U.S. Cl.
CPC ............ *G02B 27/0101* (2013.01); *G02B 1/11* (2013.01); *G02B 1/113* (2013.01); *G02B 27/01* (2013.01); *G02F 1/133555* (2013.01); *G02B 2027/0112* (2013.01); *G02B 2027/0118* (2013.01); *G02F 1/133502* (2013.01); *G02F 1/157* (2013.01)

(58) Field of Classification Search
None
See application file for complete search history.

(56) References Cited

U.S. PATENT DOCUMENTS

| | | | | |
|---|---|---|---|---|
| 5,022,730 | A | * 6/1991 | Cimini | .................... G02F 1/225 |
| | | | | 385/122 |
| 5,407,733 | A | * 4/1995 | Bjornard | ............. C03C 17/3435 |
| | | | | 428/216 |
| 5,928,572 | A | 7/1999 | Tonar et al. | |
| 5,998,617 | A | 12/1999 | Srinivasa et al. | |
| 6,020,987 | A | 2/2000 | Baumann et al. | |
| 6,037,471 | A | 3/2000 | Srinivasa et al. | |
| 6,137,620 | A | 10/2000 | Guarr et al. | |
| 6,141,137 | A | 10/2000 | Byker et al. | |
| 6,193,912 | B1 | 2/2001 | Thieste et al. | |
| 6,241,916 | B1 | 6/2001 | Claussen et al. | |

(Continued)

FOREIGN PATENT DOCUMENTS

| | | |
|---|---|---|
| EP | 0441011 A1 | 10/1993 |
| WO | 9842796 A1 | 10/1998 |
| WO | 9902621 A1 | 1/1999 |

*Primary Examiner* — Ryan Crockett
(74) *Attorney, Agent, or Firm* — Price Heneveld LLP; Bradley D. Johnson

(57) ABSTRACT

A transparency includes a first substrate having a first surface and a second surface. A second substrate includes a third surface and a fourth surface. An optical coating is positioned on the fourth surface. The optical coating has a refractive index real component n of greater than about 1.8 and an nk ratio of greater than about 0.6, as measured at 550 nm. The fourth surface has a reflectance of less than about 1.2%, as measured from the first surface.

20 Claims, 14 Drawing Sheets

(56) References Cited

U.S. PATENT DOCUMENTS

| | | | |
|---|---|---|---|
| 6,249,369 B1 | 6/2001 | Theiste et al. | |
| 6,519,072 B2 | 2/2003 | Nishikitani et al. | |
| 8,342,074 B1* | 1/2013 | Sane | F41H 5/266 |
| | | | 89/36.14 |
| 8,368,992 B2* | 2/2013 | Neuman | G02F 1/155 |
| | | | 359/267 |
| 2005/0007645 A1* | 1/2005 | Tonar | G02F 1/157 |
| | | | 359/265 |
| 2006/0215413 A1* | 9/2006 | Mathieu | B60Q 1/2665 |
| | | | 362/494 |
| 2009/0296190 A1* | 12/2009 | Anderson | B32B 27/286 |
| | | | 359/247 |
| 2010/0246017 A1* | 9/2010 | Tonar | B60R 1/088 |
| | | | 359/604 |
| 2011/0080629 A1* | 4/2011 | Neuman | G02F 1/155 |
| | | | 359/265 |
| 2012/0033285 A1* | 2/2012 | Baumann | B60R 1/088 |
| | | | 359/267 |
| 2012/0229882 A1* | 9/2012 | Fish, Jr. | B60R 1/06 |
| | | | 359/267 |
| 2013/0174892 A1* | 7/2013 | Ganjoo | H01L 51/5206 |
| | | | 136/252 |
| 2015/0009570 A1* | 1/2015 | Amano | G02B 1/11 |
| | | | 359/601 |
| 2016/0147126 A1* | 5/2016 | Cammenga | G02F 1/157 |
| | | | 359/275 |
| 2017/0343803 A1* | 11/2017 | Tonar | B60R 1/088 |
| 2018/0105114 A1* | 4/2018 | Geerlings | G02F 1/163 |
| 2018/0364402 A1* | 12/2018 | Ballou | C23C 14/025 |

* cited by examiner

ANTIREFLECTION COATINGS

CROSS-REFERENCE TO RELATED APPLICATIONS

This application is a divisional of U.S. patent application Ser. No. 15/788,939, filed on Oct. 20, 2017, entitled ANTIREFLECTION COATINGS, now issued U.S. Pat. No. 10,591,724, which claims the benefit of and priority to U.S. Provisional Patent Application No. 62/410,913, filed on Oct. 21, 2016, entitled ANTIREFLECTION COATINGS, the entire disclosures of which are hereby incorporated herein by reference in their entirety.

This application is related to U.S. patent application Ser. No. 16/812,499, filed on the same date as the present application, and entitled ANTIREFLECTION COATINGS, which is a divisional of U.S. patent application Ser. No. 15/788,939, filed on Oct. 20, 2017, entitled ANTIREFLECTION COATINGS, now issued U.S. Pat. No. 10,591,724, which claims the benefit of and priority to U.S. Provisional Patent Application No. 62/410,913, filed on Oct. 21, 2016, entitled ANTIREFLECTION COATINGS, the entire disclosures of which are hereby incorporated herein by reference in their entirety.

FIELD OF THE DISCLOSURE

The present disclosure generally relates to transparencies, and more particularly, to transparencies incorporating antireflection coatings.

SUMMARY OF THE DISCLOSURE

According to one aspect of the present disclosure, a transparency includes a first substrate having a first surface and a second surface. A second substrate includes a third surface and a fourth surface. An optical coating is positioned on the fourth surface. The optical coating has a refractive index real component n of greater than about 1.8 and an nk ratio of greater than about 0.6, both as measured at 550 nm. The reflectance of the fourth surface has a reflectance of less than about 1.2% as measured from the first surface.

DETAILED DESCRIPTION

Figure 1:
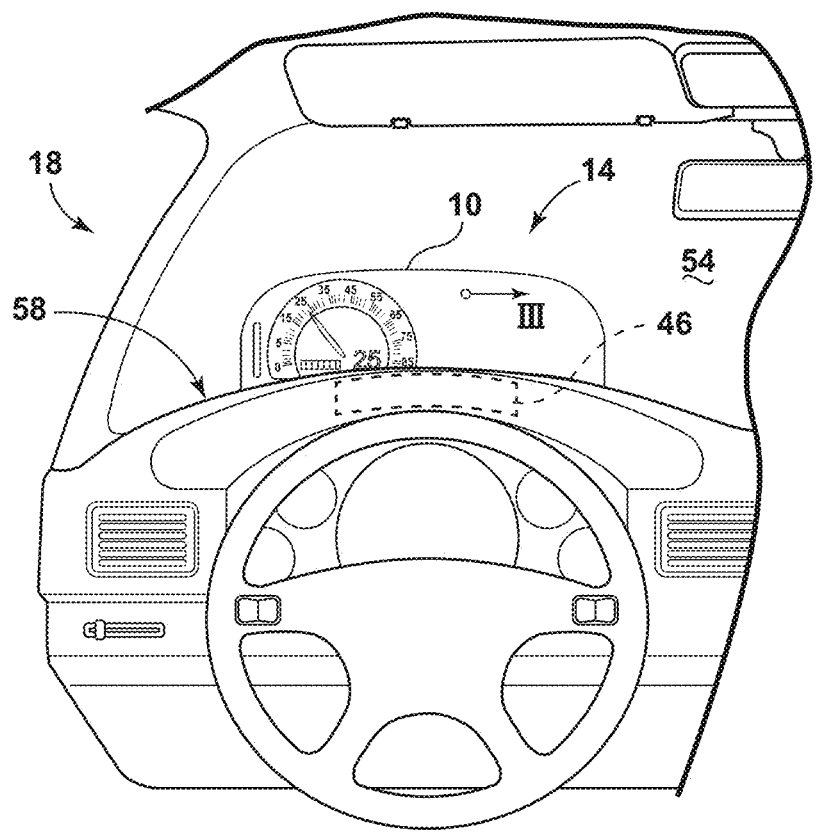
FIG. 1 is a front perspective view of a heads-up display system incorporating an electro-optic-element, according to one example.

The present illustrated embodiments reside primarily in combinations of method steps and apparatus components related to an electro-optic assembly, more particularly, a heads-up display system having an electro-optic assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the element closer to an intended viewer of the electro-optic heads-up display assembly, and the term "rear" shall refer to the surface of the element further from the intended viewer of the electro-optic heads-up display system. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
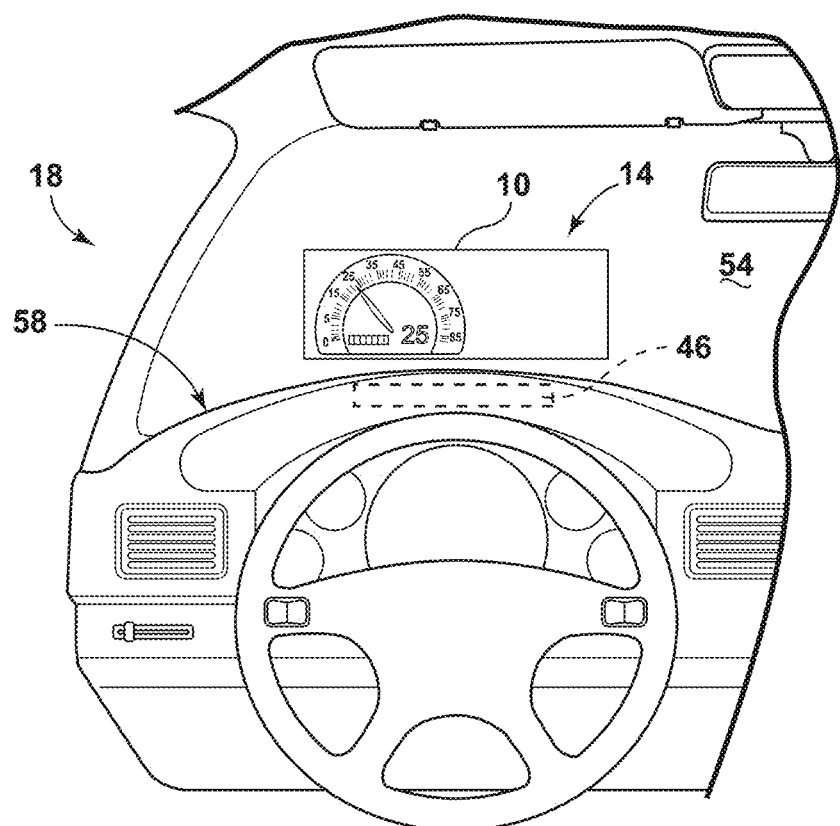
FIG. 2 is a front perspective view of a heads-up display system incorporating an electro-optic-element, according to another example.
Figure 3:
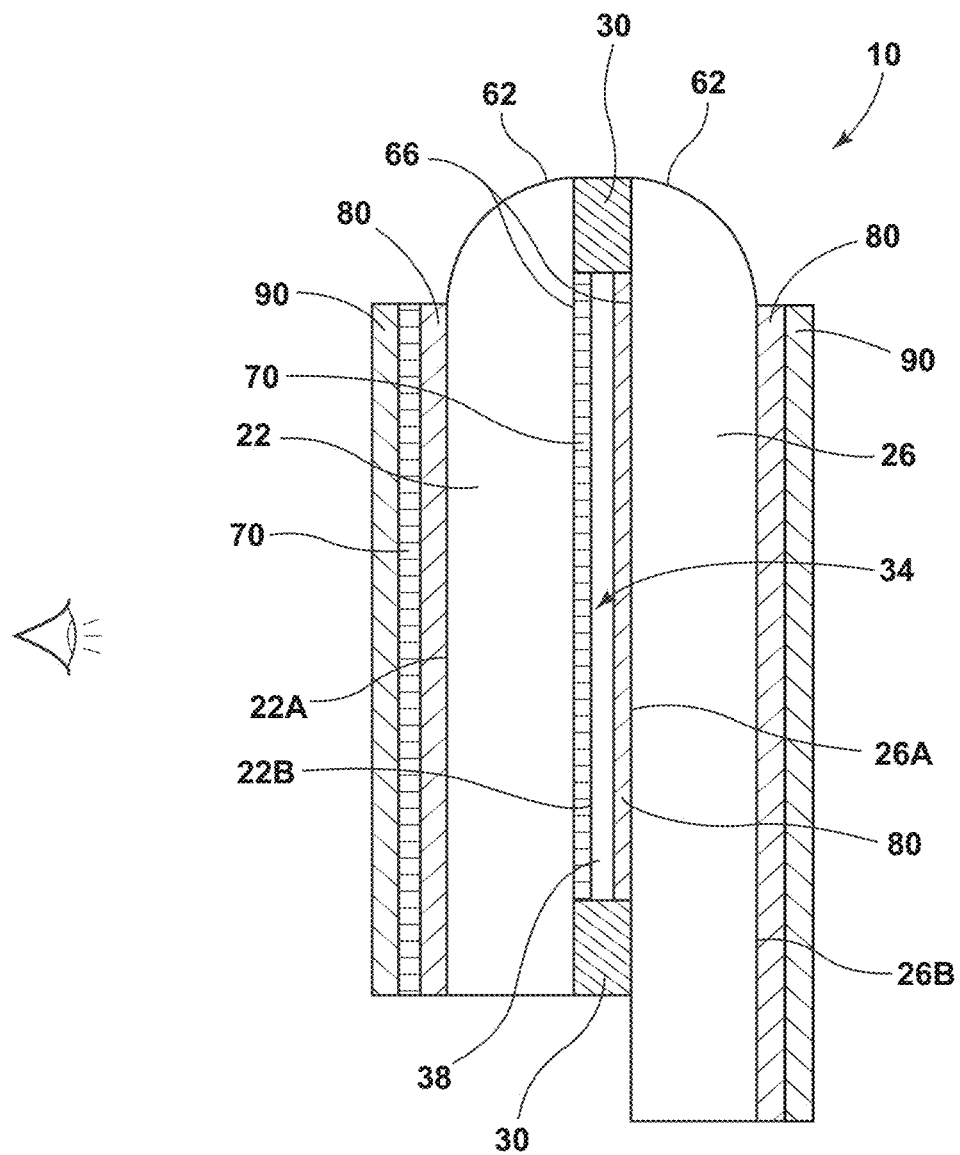
FIG. 3 is a cross-sectional view of the electro-optic assembly of FIG. 1 across line III.

In regards to FIGS. 1-3, reference numeral 10 generally designates an electro-optic assembly. The electro-optic assembly 10 may be utilized in a heads-up display system 14 of a vehicle 18. The electro-optic assembly 10 can have a first partially reflective, partially transmissive glass substrate 22 and a second partially reflective, partially transmissive glass substrate 26. The first substrate 22 can have a first surface 22A and a second surface 22B. The second substrate 26 can have a third surface 26A and a fourth surface 26B. The first and second substrates 22, 26 can be positioned in a parallel spaced-apart relationship and can have a seal 30 substantially around a perimeter of the first and second substrates 22, 26. The first substrate 22 and the second substrate 26 define a cavity 34. An electro-optic medium 38 is in the cavity 34 between the first and second substrates 22, 26. In at least one example, the electro-optic assembly 10 is configured to have a non-varying reflectance and a varying transmittance. A "clear state" of the electro-optic assembly 10 refers to the condition of maximum transmittance. The activation of the electro-optic medium 38 may reduce the transmittance of the electro-optic assembly 10 to a "darkened state." The "low end" transmittance refers to the minimum transmittance attainable by the electro-optic assembly 10.

By way of explanation and not limitation, the electro-optic assembly 10 can be included in the heads-up display (HUD) system 14 of the vehicle 18. In such an example, the electro-optic element 10 may function as a combiner screen to reflect a primary image projected by a projector 46. The electro-optic assembly 10 can be controlled to vary the amount of light transmission based on input from a control circuit. For example, in daylight conditions the electro-optic assembly 10 may be darkened to improve or increase the contrast ratio and allow for improved visibility of information projected on the electro-optic assembly 10 from the projector 46. The contrast ratio may represent the ratio of a primary reflected image from the projector 46 and the light transmitted through the electro-optic assembly 10 (e.g., in either the clear state or the darkened state).

The heads-up display system 14 is capable of use in a variety of applications, such as automotive and aerospace applications, to present information to a driver or pilot while allowing simultaneous forward vision. In some examples the heads-up display system 14 may be provided vehicle rearward of a windscreen 54 and protruding from an instrument panel 58 (FIG. 1) while in other examples the electro-optic assembly 10 may be positioned directly on the windscreen 54 (FIG. 2). The electro-optic assembly 10 may be any size, shape, bend radius, angle or position. The electro-optic assembly 10 can be used to display many vehicle-related functions or driver assistance systems such as alerts, warnings or vehicle diagnostics. In the depicted examples, the speed of the vehicle 18 is being displayed on the electro-optic assembly 10.

In regards to heads-up display systems 14, the image projected onto the electro-optic assembly 10 should be bright enough to see in any condition. This is particularly challenging when the lighting outside the vehicle 18 is bright. The contrast between the light from the projector 46 and the lighting behind the electro-optic assembly 10 can be low on a bright sunny day. While a brighter, more intense lighting source (e.g., the projector 46) improves the contrast, increasing the display brightness may not be the most economical solution and a display that is bright enough to provide reasonable contrast in very bright daylight conditions will be too bright in other conditions. Although controls may be used to deal with variations in brightness, the specific background is ever changing in a moving vehicle, and depends in part on the position of the driver's eyes. In accordance with one example, the electro-optic assembly 10 can be configured to lower the transmission and/or to increase the contrast ratio.

Depending on the application, there may be a need for a higher or lower transmittance in the clear state, different reflectance values for optimal contrast ratios, and/or broader dynamic range of the transmittance levels. The initial reflectance and range of transmittance properties is further complicated by the capabilities of the projector 46 employed with the heads-up display system 14 and the light output capabilities of the projector 46 along with the light transmittance levels for the windscreen 54. The windscreen 54 will have a direct impact on the contrast ratio and visibility of the image from the heads-up display system 14. There are a number of factors which affect the transmittance levels of the windscreen 54. The minimum light transmittance is based on the rules in the location in which the vehicle 18 is sold but higher transmittance levels may be present based on how the vehicle 18 is equipped and marketed. This range of factors creates the need for solutions which can be adapted to different vehicle and environmental conditions.

Another aspect that should be considered when utilizing the heads-up display system 14 is that of secondary reflections which may result from the non-transflective surfaces, such as the first through fourth surfaces 22A-26B of the first and second substrates 22, 26. For example, if a transflective coating is on the first surface 22A, then the secondary reflectances may originate from the second through fourth surfaces 22B-26B. Alternatively, if the transflective coating is on the second surface 22B, then the secondary reflectances may originate from the first, third or fourth surfaces 22A, 26A, 26B. Reflection off of the first through fourth surfaces 22A-26B may create a double image effect from secondary reflections that do not perfectly align with the primary reflected image (e.g., due to geometries of the components of the electro-optic assembly 10). The double image that may be formed from secondary reflections off the first through fourth surfaces 22A-26B may cause the primary image projected by the projector 46 and reflected by the transflective coating of the electro-optic assembly 10 to appear blurry or unclear.

According to one example, the electro-optic assembly 10 can be assembled using two approximately 1.6 mm glass substrates (e.g., the first and second substrates 22, 26) which are both bent with a spherical radius of approximately 1250 mm. Other thicknesses or radii for the first and second substrates 22, 26 may be substituted without departing from the teachings provided herein. In other examples the first and second substrates 22, 26 may be bent to have a "free-form" shape. The desired shape is one in which the resultant primary reflected image "appears" to be forward of the electro-optic assembly 10 and forward of the vehicle 18. The exact surface contour needed to attain this characteristic is a function of the properties of the projector 46 and driver location, as well as the electro-optic assembly 10 location relative to the other two locations. Having the image projected forward of the vehicle 18 allows the driver to obtain the desired information without having to change their focal distance. In a traditional heads-up display located within the vehicle 18, the driver's eyes often have to refocus to the shorter viewing distance thus decreasing the time spent viewing the road. Furthermore, the driver's eyes will also then have to re-focus on the road ahead, which further decreases the time spent viewing the road and forward conditions. The shape of the electro-optic assembly 10 should also be selected so as to preserve the basic characteristics of the projected image (i.e., straight lines remain straight, aspect ratios of images are preserved, etc.).

Referring now to FIG. 3, the first substrate 22 includes the first surface 22A and the second surface 22B. The second surface 22B can be coated with indium tin oxide with a sheet resistance of approximately 12 ohms/sq. The first surface 22A can be concave and can be coated with chromium (Cr). The coated first substrate 22 may have a transmission of approximately 37.8% and reflectance of approximately 25.4%. The second substrate 26 defines the third and fourth surfaces 26A, 26B. The third surface 26A can be coated with indium tin oxide with a sheet resistance of approximately 12 ohms/sq.

From the first surface 22A, the electro-optic assembly 10 can have a clear state reflectance of approximately 25% and a transmittance of approximately 24%. The electro-optic assembly 10 can have a low end, or state, transmittance of approximately 10.5% and a reflectance from the first surface 22A of approximately 15%. Alternatively, in other examples, the high end, or state, transmittance of the electro-optic assembly 10 may be greater than 45% or even 60%. The characteristics of the electro-optic assembly 10 may also be altered so that the low end transmittance is less than 7.5% or even less than 5% in the darkened state. In some examples, transmittance levels down to 2.5% or less may be desirable. Increasing the high-end transmittance may be obtained by the use of coatings and materials which have low absorption. Lower low-end transmittances may optionally be obtained through the inclusion of materials which have higher absorption. If a wide dynamic range is desired, then low absorption materials may be used in combination with electro-optic materials and cell spacings (e.g., the space between the first and second substrates 22, 26) which attain higher absorbance in the activated state. Those skilled in the art will recognize that there exists a multitude of combinations of coatings and electro-optic materials, cell spacings and coating conductivity levels which can be selected to attain particular device characteristics.

Still referring to FIG. 3, to provide electric current to the first and second substrates 22, 26 and electro-optic medium 38, electrical elements may be provided on opposing sides of the first and second substrates 22, 26 (e.g., the second and third surfaces 22B, 26A) to generate an electrical potential therebetween. In one example, a J-clip may be electrically engaged with each electrical element, and element wires extend from the J-clips to a primary printed circuit board. Other contact designs are possible including the use of conductive ink or epoxy.

According to various examples, the electro-optic medium 38 may be an electrochromic medium and/or liquid crystal (e.g., a twisted nematic) medium/material. In electrochromic examples, the electro-optic medium 38 may include at least one solvent, at least one anodic material, and at least one cathodic material. Typically, both of the anodic and cathodic materials are electroactive and at least one of them is electrochromic. It will be understood that regardless of its ordinary meaning, the term "electroactive" may mean a material that undergoes a modification in its oxidation state upon exposure to a particular electrical potential difference. Additionally, it will be understood that the term "electrochromic" may mean, regardless of its ordinary meaning, a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity change from a first phase to a second phase. The electrochromic component may be a single-layer, single-phase component, multi-layer component, or multi-phase component, as described in U.S. Pat. No. 5,928,572 entitled "ELECTROCHROMIC LAYER AND DEVICES COMPRISING SAME," U.S. Pat. No. 5,998,617 entitled "ELECTROCHROMIC COMPOUNDS," U.S. Pat. No. 6,020,987 entitled "ELECTROCHROMIC MEDIUM CAPABLE OF PRODUCING A PRE-SELECTED COLOR," U.S. Pat. No. 6,037,471 entitled "ELECTROCHROMIC COMPOUNDS," U.S. Pat. No. 6,141,137 entitled "ELECTROCHROMIC MEDIA FOR PRODUCING A PRE-SELECTED COLOR," U.S. Pat. No. 6,241,916 entitled "ELECTROCHROMIC SYSTEM," U.S. Pat. No. 6,193,912 entitled "NEAR INFRARED-ABSORBING ELECTROCHROMIC COMPOUNDS AND DEVICES COMPRISING SAME," U.S. Pat. No. 6,249,369 entitled "COUPLED ELECTROCHROMIC COMPOUNDS WITH PHOTOSTABLE DICATION OXIDATION STATES," and U.S. Pat. No. 6,137,620 entitled "ELECTROCHROMIC MEDIA WITH CONCENTRATION ENHANCED STABILITY, PROCESS FOR THE PREPARATION THEREOF AND USE IN ELECTROCHROMIC DEVICES," and U.S. Pat. No. 6,519,072 entitled "ELECTROCHROMIC DEVICE"; and International Publication Nos. WO 98/42796 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," and WO 99/02621 entitled "ELECTROCHROME POLYMER SYSTEM," which are herein incorporated by reference in their entirety. The first and second substrates 22, 26 are not limited to glass elements but may also be any other element having partially reflective, partially transmissive properties.

In the non-limiting, depicted example of FIG. 3, each of the first and second substrates 22, 26 include a rounded edge 62 and a contact edge 66 that is not rounded. It will be understood that the finished assembly 10 may or may not have the depicted configuration. The non-rounded contact edge 66 may be desirable for ease of contact, and if the device is supported by that edge, there would be no need to round the first and second substrates 22, 26 along the contact edge 66. Any exposed edge on the electro-optic assembly 10 may be generally rounded. The radius of curvature of the rounded edges 62 may be greater than approximately 2.5 mm.

The electro-optic assembly 10 may include a transflective coating 70, an optical coating 80, and a scratch-resistant coating 90. In the depicted example, the transflective coating 70 is positioned proximate the first surface 22A, but may additionally or alternatively be positioned on the second surface 22B without departing from the teachings provided herein. In the depicted example, the optical coating 80 is on the first, third and fourth surfaces 22A, 26A, 26B, but it will be understood that the optical coating 80 may additionally or alternatively be positioned on the second surface 22B without departing from the teachings provided herein. The optical coatings 80 on the second and third surfaces 22B, 26A, in certain examples, function as electrodes (e.g., an antireflective electrode) to enable darkening of electro-optic medium 38. It will be understood, that when the transflective coating 70 is located on the second surface 22B, in certain examples, it may also serve a dual purpose and also act as an electrode. In the depicted example, the scratch-resistant coating 90 is positioned proximate the first and fourth surfaces 22A, 26B.

As described in greater detail below, the optical coating 80 may be used to both lower the reflectance of a surface (e.g., the fourth surface 26B) of a substrate (e.g., the second substrate 26) as viewed through the substrate, and/or to decrease the transmission of light through the substrate. The antireflective and transmission properties of the optical coating 80 may change as the thickness of the coating 80 is altered. For example, as the thickness of the optical coating 80 is increased, the reflection from the surface may be decreased to a minimum and then begin to rise again. In order to attain this characteristic, the optical coating 80 includes a thin coating (e.g., such as a metal) with appropriate optical constants which are explained in greater detail below. At the point at which the optical coating 80 has a thickness such that the reflection from the surface is substantially equal (e.g., ±less than about 10%, 5%, 3%, 2%, 1% absolute) to that of an uncoated substrate, the transmission through the substrate and the optical coating 80 may be decreased (e.g., by greater than about 5%, 10%, 15%, 20%, 25%, 30%, 35%, 40%, 45%, 50%, 55%, 60% absolute) relative to an uncoated portion of the substrate. In other words, the optical coating 80 does not substantially affect the reflectivity of the fourth surface 26B. Such a difference between the coated and uncoated surfaces may be known as a reflectance deviation. Such an optical coating 80 with an equivalent reflectivity as the fourth surface 26B of the second substrate 26, but a lower transmission, may be known as an equivalence layer. A tradeoff may be obtained between reflectivity and transmission by altering the refractive index and/or thickness of the optical coating 80. The specific combinations of reflectance and transmittance will vary depending on the different examples (described below). The square of the transmittance is a characteristic referred herein as the attenuation factor (described below). In certain examples the attenuation factor should be less than about 65%. It will be understood that although described in connection with the electro-optic assembly 10, the optical coating 80 may equally be applied to any desired transparency (e.g., individual substrates such as pieces of glass or plastic, windows, the windscreen 54, packaging, etc.). By tailoring the optical coating 80 to have a reflectivity substantially similar to that of the uncoated substrate, but have a lower transmission, the optical coating 80 may not be readily apparent to a viewer. Such a use may be advantageous in concealing objects proximate and rearward to the optical coating 80 or for generally decreasing the intensity of light passing through the substrate. Further, use of the optical coating 80 may be advantageous in that the ability to use a single material for both antireflective and decreased transmission applications may simplify manufacturing. The optical coating 80 may include metal layers, dielectric layers, and stacks including both (e.g., in an alternating manner).

Antireflective Optical Coatings

Figure 4:
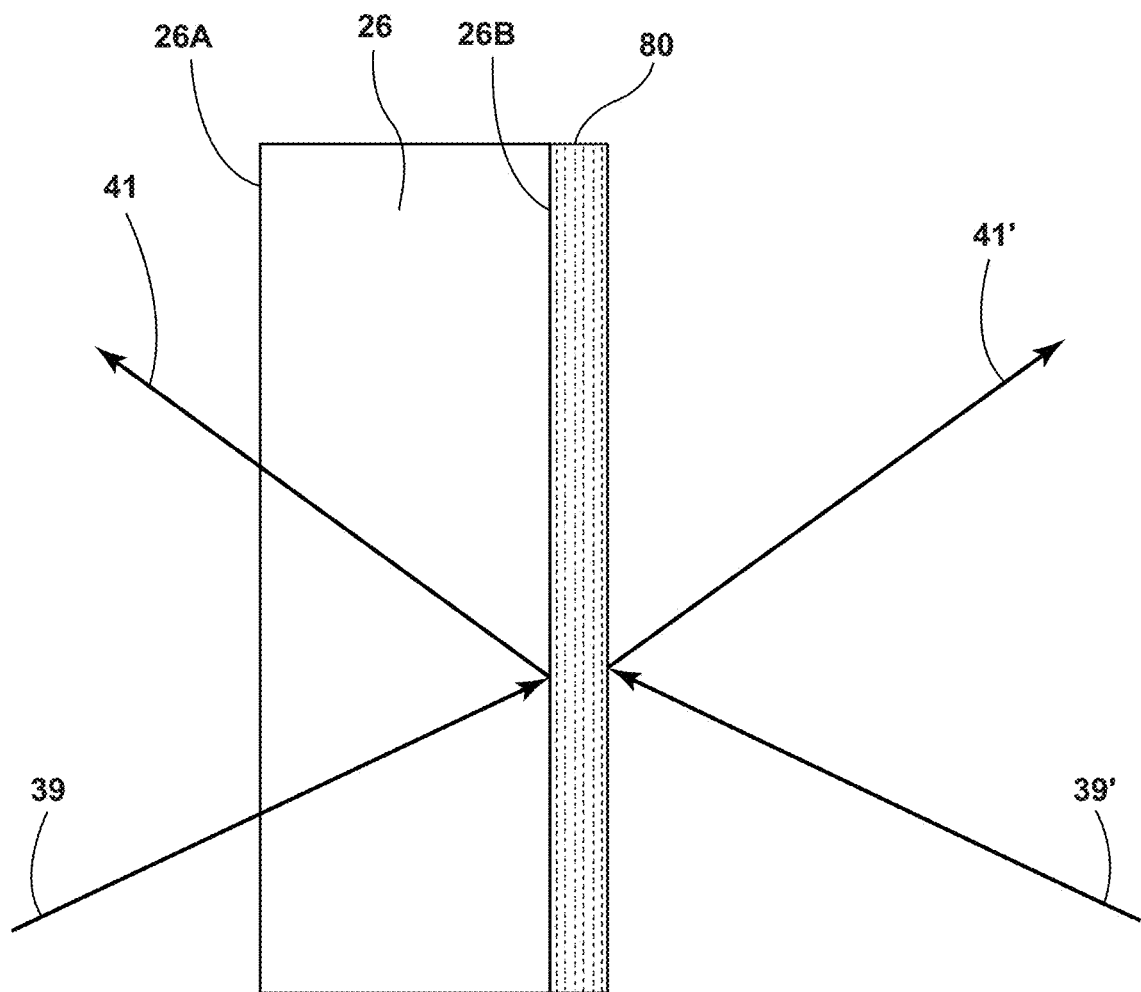
FIG. 4 is a cross-sectional view of a second substrate.
Figure 5:
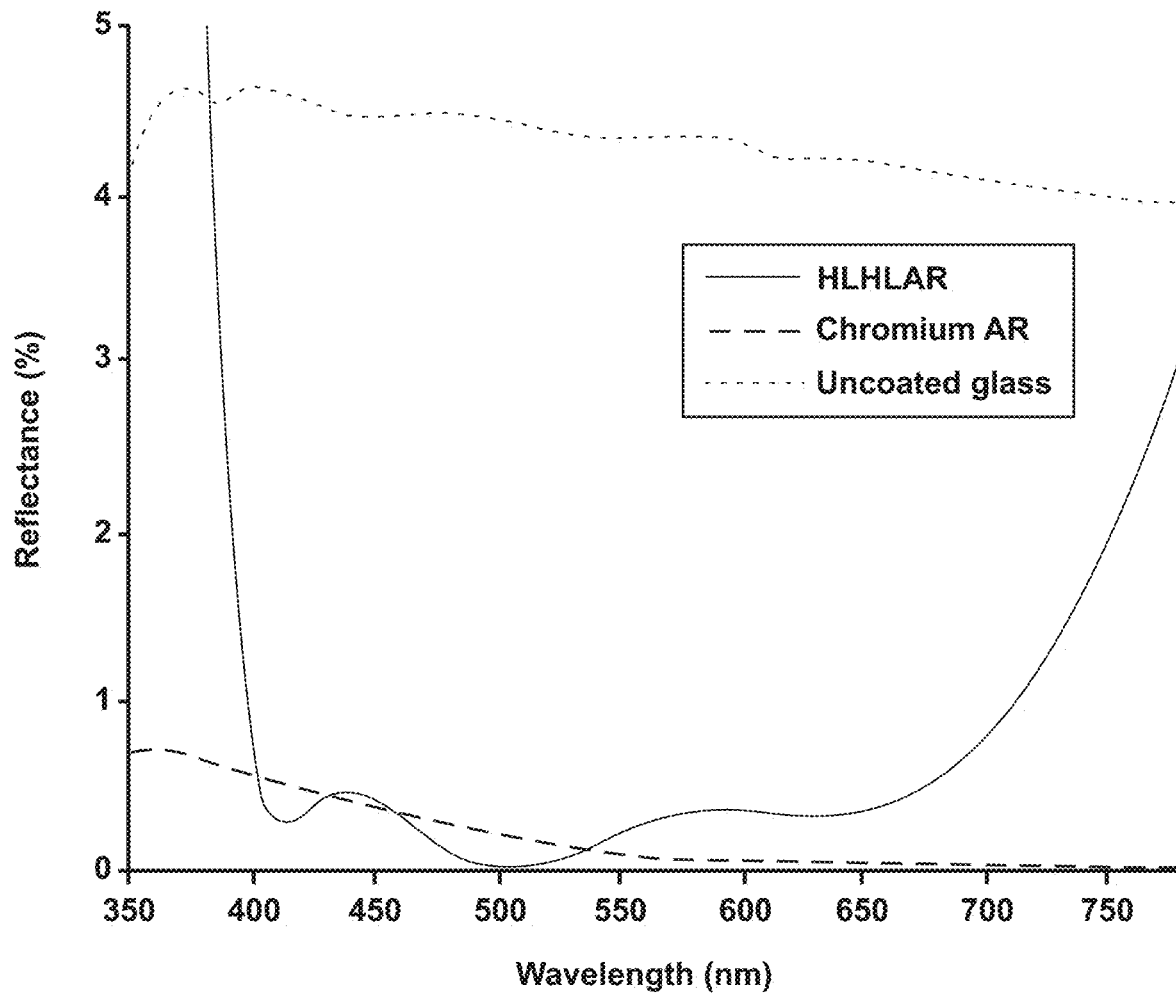
FIG. 5 illustrates the reflectance versus wavelength dependence of a metallic and a dielectric AR coating compared to raw glass.

Unlike other traditional antireflective applications, it is important to note that the problem being solved is not the reflectance as viewed from the fourth surface 26B, but rather, from the reverse direction (e.g., from the third surface 26A) as shown in FIG. 4 simplified with a single substrate (i.e., the second substrate 26). In other words, the reflection through the substrate should be minimized. For example, a light beam 39 incident on surface 26B may reflect as reflected beam 41. Beam 41 may have low reflectance, relative to an uncoated portion of the second substrate 26, due to the optical coating 80 on the fourth surface 26B. A light beam 39' directed toward surface 26B from the opposite direction will have reflected beam 41'. The optical coating 80 is not required to provide antireflection properties from this direction opposite the viewer. Thus, the reflectance as viewed from the fourth surface 26B actually does not have any reflectance constraints. This unique set of optical constraints can be solved with a new type of optical coating design based on thin layers including materials such as metals. It has been discovered that the reflectance of a thin metal coating will vary by the direction viewed. For example, when a Cr coating is applied to a glass substrate the reflectance from the coating side will steadily increase. Conversely, the reflectance when viewed through the glass will have an alternate behavior. As the metal coating layer increases thickness, the reflectance drops initially, goes through a minimum before it steadily increases in reflectance as explained above. This effect occurs for very thin coating layers. An example of the reflectance in dependence of wavelength in the visible range is illustrated in FIG. 5 for a glass/air interface in the uncoated state, a glass/air interface with a four layer HL (alternating high and low refractive index) example of the optical coating 80, and a glass/air interface with a thin chromium example of the optical coating 80. From this, it is possible to observe that the thin metal layer reduces a dramatic amount of reflectance from the glass as viewed from the observer perspective.

It has been discovered that certain metals, materials or alloys will produce an antireflection effect where the reflectance, as viewed through the substrate, is quite low. The antireflection effect may be obtained by a variety of metals or materials with unique optical properties. One such optical property is the refractive index. The refractive indices of materials have a real component, n, and an imaginary component, k. The antireflection effect for a series of metals and alloys was analyzed using thin film modeling techniques to determine the appropriate relationship between n and k which will provide adequate antireflection properties. The analysis looked at n and the ratio of nk. Table 1 provides a list of potential materials with refractive indices from which the optical coating 80 may be formed.

TABLE 1

Materials studied, resultant optimal antireflection property, and the n, k and nk ratio for the material at 550 nm wavelength.

| Material | Combined 1st and 2nd Surface Reflectance Y optimized | Reflectance (2nd surface only) | Transmittance (2nd surface interface only) | Reflectance (from rearward direction) | Thickness (nm) | n '@ 550 nm | k '@ 550 nm | nk ratio |
|---|---|---|---|---|---|---|---|---|
| AlSi6040 | 4.58 | 0.46 | 68.05 | 10.84 | 1.39 | 3.13 | 4.49 | 0.70 |
| AlSi8020 | 6.25 | 2.27 | 80.21 | 7.90 | 1.25 | 1.56 | 4.51 | 0.35 |
| AlSi8515 | 6.70 | 2.76 | 83.92 | 6.97 | 1.03 | 1.29 | 4.67 | 0.28 |
| AlSi9010 | 6.90 | 2.93 | 85.23 | 6.63 | 0.88 | 1.24 | 4.94 | 0.25 |
| AlTi5050 | 4.32 | 0.18 | 66.36 | 11.23 | 2.83 | 2.54 | 2.96 | 0.86 |
| AlTi7030 | 4.31 | 0.16 | 66.26 | 11.25 | 2.18 | 2.88 | 3.39 | 0.85 |
| AlTiRu90-8-2 | 5.62 | 1.59 | 75.39 | 9.09 | 1.08 | 2.28 | 5.12 | 0.45 |
| Cadmium | 6.90 | 2.95 | 85.38 | 6.59 | 1.25 | 1.04 | 4.06 | 0.26 |
| Cu | 6.82 | 2.66 | — | — | — | 0.95 | 2.58 | 0.37 |
| CuSn5050 | 5.63 | 1.47 | — | — | — | 1.87 | 4.13 | 0.45 |

TABLE 1-continued

Materials studied, resultant optimal antireflection property, and the n, k and nk ratio for the material at 550 nm wavelength.

| Material | Combined 1st and 2nd Surface Reflectance Y optimized | Reflectance (2nd surface only) | Transmittance (2nd surface interface only) | Reflectance (from rearward direction) | Thickness (nm) | n '@ 550 nm | k '@ 550 nm | nk ratio |
|---|---|---|---|---|---|---|---|---|
| CuZn | 7.53 | 3.37 | — | — | — | 0.59 | 2.85 | 0.21 |
| Ge | 5.09 | 0.93 | — | — | — | 4.62 | 2.09 | 2.21 |
| Ir | 5.28 | 1.12 | — | — | — | 2.23 | 4.31 | 0.52 |
| Mo | 4.19 | 0.03 | 65.53 | 11.42 | 1.71 | 3.78 | 3.52 | 1.07 |
| MoRe | 4.16 | 0.00 | 65.35 | 11.46 | 0.93 | 4.92 | 4.88 | 1.01 |
| MoRe-8 | 4.19 | 0.03 | — | — | — | 3.95 | 4.10 | 0.96 |
| MoSi2 | 5.03 | 0.87 | — | — | — | 4.67 | 2.33 | 2.00 |
| MoTa-1 | 4.19 | 0.03 | 65.47 | 11.44 | 1.77 | 3.49 | 3.61 | 0.97 |
| MoTa-10 | 4.20 | 0.04 | — | — | — | 3.84 | 4.08 | 0.94 |
| MoTa-4 | 4.27 | 0.11 | — | — | — | 2.96 | 3.37 | 0.88 |
| MoW-1 | 4.19 | 0.03 | — | — | — | 3.64 | 3.84 | 0.95 |
| Ni2Si | 4.40 | 0.24 | — | — | — | 1.95 | 2.23 | 0.87 |
| Niobium | 4.20 | 0.04 | 65.56 | 11.41 | 2.66 | 2.92 | 2.87 | 1.02 |
| Palladium | 5.84 | 1.68 | — | — | — | 1.64 | 3.85 | 0.43 |
| Platinum | 5.08 | 0.92 | — | — | — | 2.13 | 3.71 | 0.57 |
| Rhenium | 4.34 | 0.18 | — | — | — | 4.25 | 3.06 | 1.39 |
| Rhodium | 5.59 | 1.43 | — | — | — | 2.08 | 4.54 | 0.46 |
| Ru | 4.83 | 0.67 | — | — | — | 3.28 | 5.46 | 0.60 |
| Stainless Steel | 4.71 | 0.55 | — | — | — | 2.44 | 3.61 | 0.68 |
| Ta | 4.17 | 0.01 | 65.38 | 11.45 | 1.81 | 3.54 | 3.48 | 1.02 |
| W | 4.17 | 0.07 | 65.75 | 11.36 | 2.28 | 3.65 | 3.71 | 0.98 |
| V | 4.22 | 0.06 | — | — | — | 3.68 | 3.01 | 1.22 |
| Zn CRC | 6.69 | 2.53 | — | — | — | 1.01 | 4.31 | 0.23 |
| Zr CRC | 4.36 | 0.22 | 66.97 | 10.88 | 11.90 | 1.82 | 0.95 | 1.92 |

In each case, the thickness was optimized to minimize the reflectance. These values were then statistically analyzed to determine which n and nk ratio will result in low reflectance. The materials were positioned on the rearward surface of a glass substrate which has first and second surfaces. The reported reflectance values in Table 1 include the sum of the reflectance from both the first and second surfaces which were used for the statistical analysis. Additional data is present in the table for the second surface reflectance and transmittance which shows the optical properties of the coated interface (the second surface) with the first surface properties absent (such as reflectance from the forward direction). Additionally, the rearward reflectance is presented in Table 1 (which also does not include reflectance from the first surface 22A. The reflectance values reported are Y values in the CIE Yxy color system which are weighted to the human eye's sensitivity to light intensity. The statistical analysis used the Y values for reflectance, but it will be understood that the reflectance may alternatively be an average over a given wavelength range (or ranges), such as the visible wavelength range, or may be a relatively narrow wavelength band. A given example may provide antireflective properties at reflectance values (described below) for one or more of these reflectance characterization methods without deviating from the teachings provided herein.

Figure 6A:
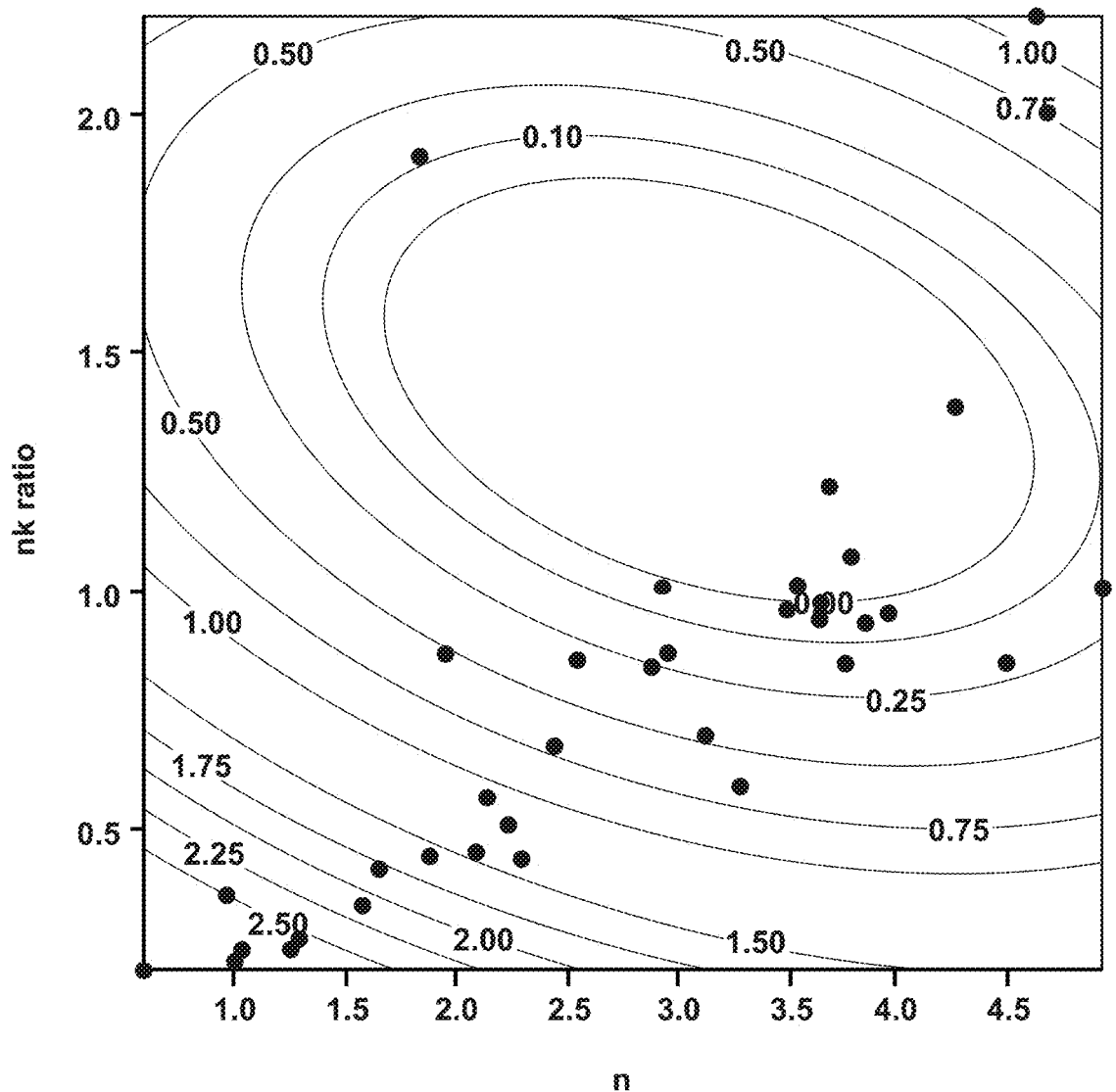
FIG. 6A is a contour plot of reflectance for nk ratio vs. n.
Figure 6B:
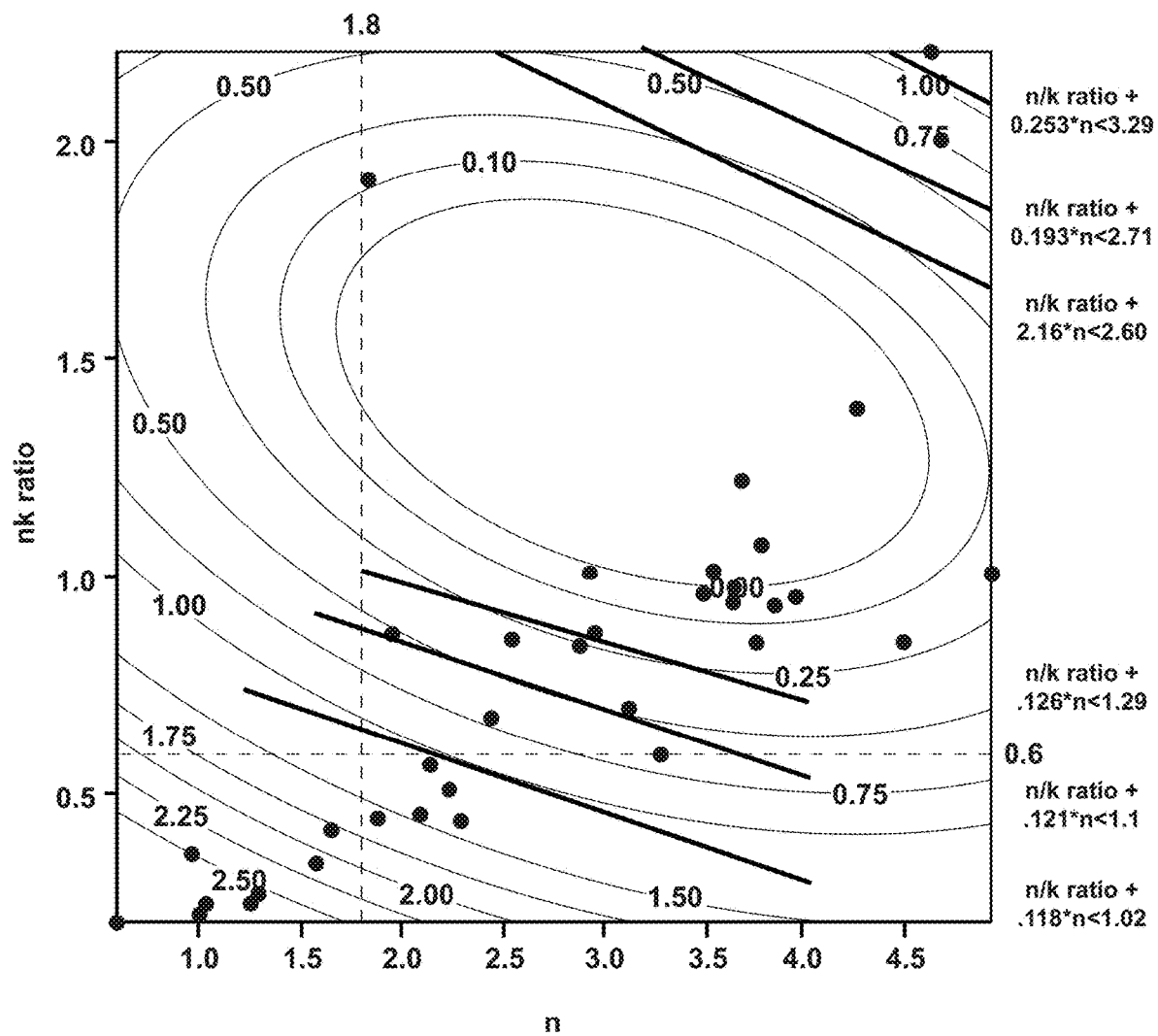
FIG. 6B is a contour plot of reflectance for nk ratio vs. n.

FIG. 6A depicts a contour plot with regions of different reflectance based on n vs. nk ratio. The reflectance from the surface coated with the optical coating 80 may be less than about 1.5%, 0.75%, 0.5%, 0.25% or less than about 0.1%. From this graphical representation of the statistical analysis, to attain a desirable reflectance, the n value may be greater than about 1.5, 2.0, 3.0 or greater than about 3.5. To obtain a desirable reflectance, the nk ratio may be greater than about 0.4, 0.5, 0.6, 0.7, 0.8, 0.9 or 1.0. From FIG. 6A, in a specific example, the n value may be greater than about 2.5 and the nk ratio between 0.6 and 2.0 such that reflectance values less than about 0.5% are attainable. In another example, the n value may be greater than about 2.75 and the nk ratio may be between about 0.8 and 1.75 which may result in reflectance values less than about 0.25%. Alternatively, the relationship between n and nk ratio may be expressed as simplified expressions. FIG. 6B shows several linear approximations for the regions in the contour plot which can be used to approximate the n and nk relationships needed to attain a given reflectance level. If a reflectance of less than about 1.0% is desired then the n and nk ratio should reside within the region defined by the equations; nk ratio+ 0.253*n<3.29 and nk ratio+1.118*n>1.02. If a reflectance of less than about 0.5% is desired then the n and nk ratio should reside within the region defined by the equations: nk ratio+ 0.193*n<2.71 and nk ratio+1.121*n>1.18. If a reflectance of less than about 0.25% is desired then the n and nk ratio should reside within the region defined by the equations; nk ratio+0.216*n<2.60 and nk ratio+1.126*n>1.29. The full statistical equation which will provide the most accurate relationship between reflectance, n and nk ratio is: Reflectance (second surface 22B only)=4.945−1.170*n−4.701*nk ratio+0.1230*$n^2$+1.345*nk $ratio^2$+0.2785*n*nk ratio. This formula may be employed for refinement of needed n and nk ratios to attain a given reflectance after one finds the general requirements using the general guidelines described above. It will be understood that the term "metal" is used herein to describe a material which meets the refractive index relationships defined above, but that the teachings are not limited explicitly to metals. Other materials meeting the refractive index requirements may be used and are within the scope of teachings provided herein. One skilled in the art will be aware that the refractive indices of materials is not constant and that they vary over the visible spectrum.

Figure 7:
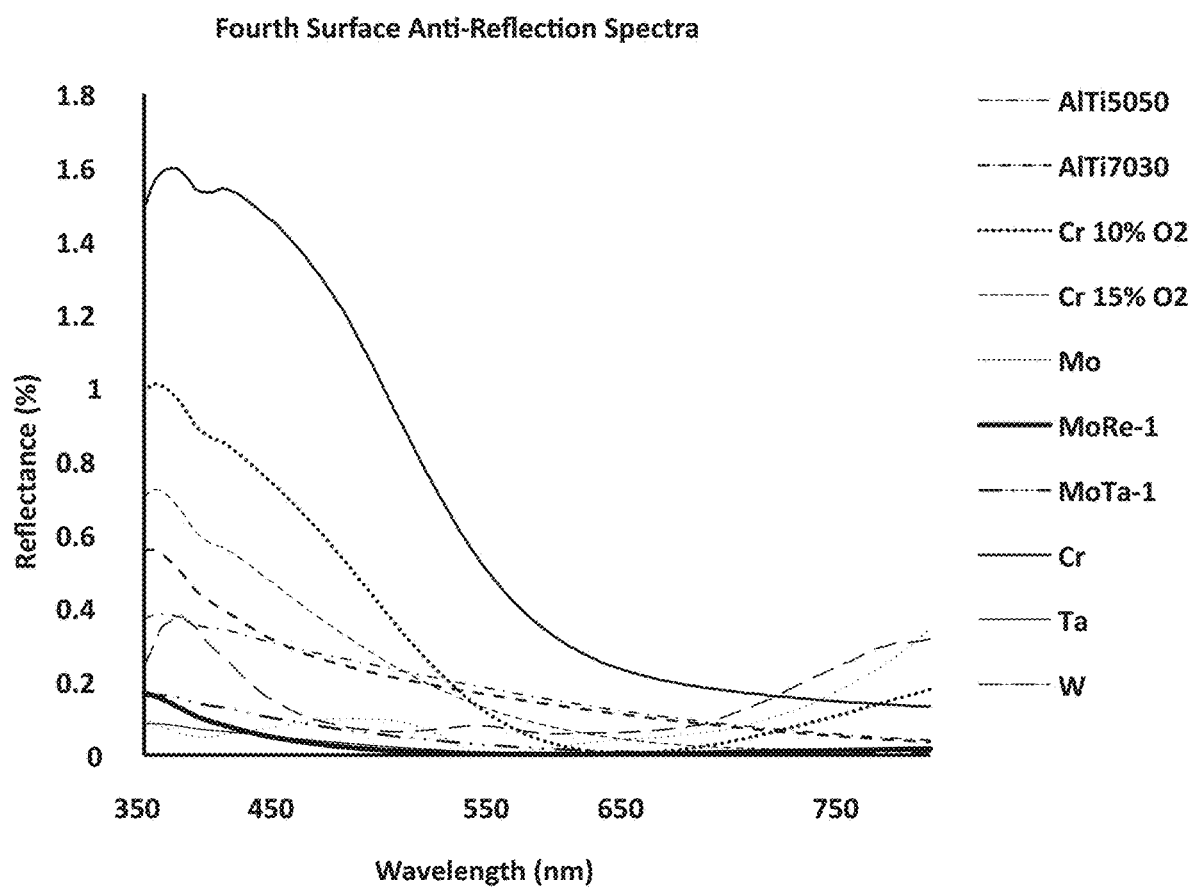
FIG. 7 is a graph of the fourth surface antireflection spectra.

Therefore, it can be expected that some optimization may be needed in tuning the refractive index and thickness to get targeted reflectance values across the desired spectra. Suitable example metals or alloys for the optical coating 80 which will have reflectance in a glass/air system include: AlSi alloys, AlTi alloys, AlTi5050, AlTi7030, chrome, Mo, MoRe alloys, MoSi2, Nb, Co, Ir, platinum, rhenium, ruthenium, stainless steel, Ta, W, V, and Zr or mixtures and alloys of these materials. Exemplary reflectance spectra for several materials are shown in FIG. 7. The reflectance spectra demonstrates that reflectance reduction occurs over a broad wavelength range.

Figure 8:
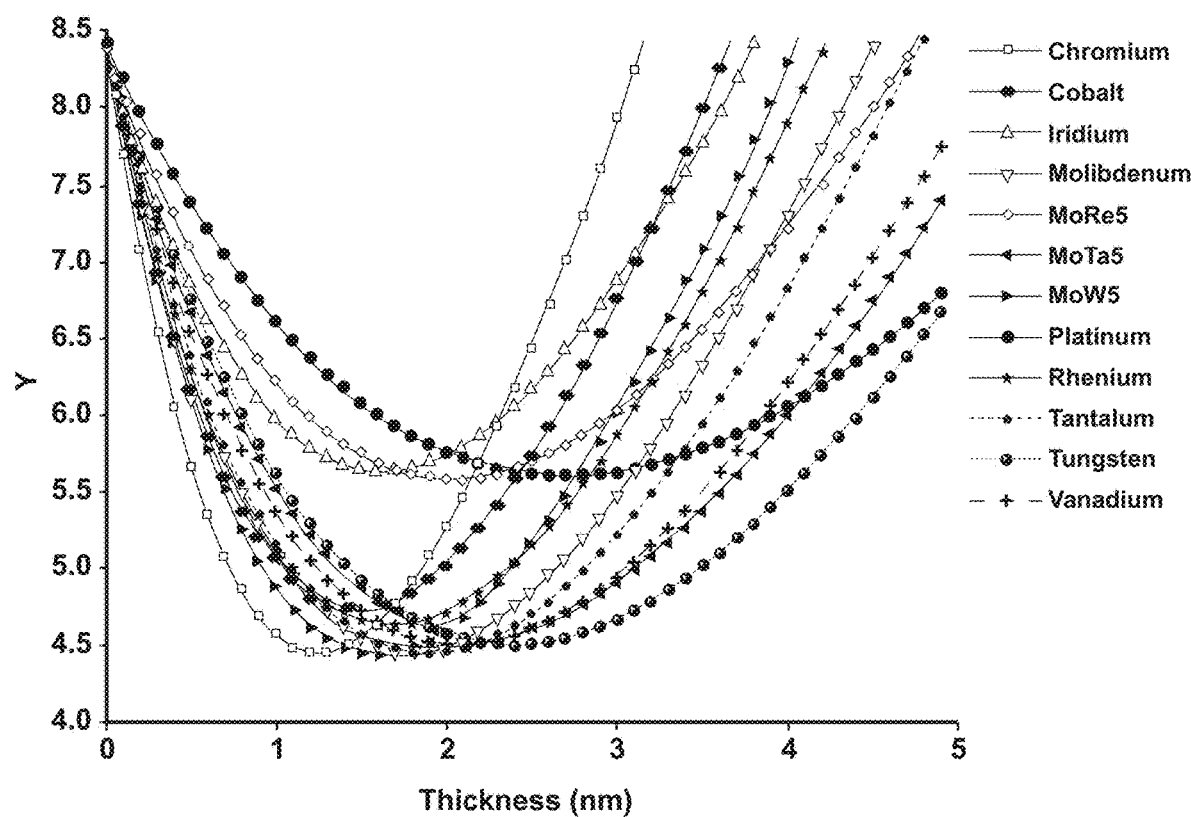
FIG. 8 illustrates reflectance of different metal-based antireflection coatings as a function of coating thickness.

The reflectance versus thickness for several metals when viewed through a substrate is illustrated in FIG. 8. The reflectance is for the eye-weighted (Y), normal incidence reflectance which includes the reflectance from the first, uncoated surface. From FIG. 8, it is possible to observe that the metals show a characteristic minimum in the reflectance at a thickness between about 0.5 and about 4.0 nm and a reduced reflectance up to 5 nm for some metals and alloys. Accordingly, when the optical coating 80 is being used as an antireflection coating, a thickness of the coating 80 may be between about 0.1 and 5 nm, or between about 0.2 and 4 nm, or between about 0.5 and 3.5 nm.

circumstances, it is desired that the colors are not modified by either being reflected, transmitted or both through the coated substrate. The preservation of color can be quantified by either the color rendering index (CRI) or by the reflected color C*. The CRI of the coated substrate may be greater than about 80, 85, 90, 95 or greater than about 99. Alternatively, in units of $C^*=\sqrt{(a^{*2}+b^{*2})}$, where a* and b* are color parameters of the CIELAB color system, the color of the optical coating 80 should have a value less than about 10, less than about 5 or most desirably less than about 2.5. Either of these metrics will describe a surface where the reflected or transmitted colors will be true or approximately match those of the output device in either a reflected or transmitted configuration or both. In other examples, the coating can be tuned to match the output of the display to enhance or compensate to achieve the desired colors. Table 2 shows selected optical coating 80 constituents from Table 1 which includes reflected and transmitted color values and respective C* values. The data in Table 2 includes the contribution to the reflectance and transmittance from the uncoated first surface. The optical coating 80 taught herein may have good C* values and would therefore function well in preserving both reflected and transmitted colors.

TABLE 2

Integrated eye-weighted reflectance minima and corresponding transmittance of single layer metallic antireflection coatings on glass.

| Material | Metal layer thickness (nm) | Yr | a*r | b*r | C*r | Yt | a*t | b*t | C*t | Absorption |
|---|---|---|---|---|---|---|---|---|---|---|
| Raw Glass | 0 | 8.43 | −0.23 | −0.95 | 0.98 | 90.71 | −0.33 | 0.27 | 0.43 | 0.86 |
| Chromium | 1.48 | 4.74 | −0.23 | −3.66 | 3.67 | 63.57 | 0.45 | −3.26 | 3.29 | 31.69 |
| Cobalt | 2.02 | 5.59 | −0.08 | −1.37 | 1.37 | 68.88 | −0.27 | −1.36 | 1.39 | 25.54 |
| Iridium | 1.62 | 5.63 | −0.59 | −1.68 | 1.78 | 69.14 | −0.52 | −1.8 | 1.87 | 25.23 |
| Mo | 1.78 | 4.47 | −0.04 | −1.11 | 1.11 | 61.98 | −0.04 | −1.11 | 1.11 | 33.55 |
| MoRe-5 | 1.25 | 4.46 | −0.04 | −0.82 | 0.82 | 61.89 | −0.16 | 1.75 | 1.76 | 33.65 |
| MoTa-5 | 2.18 | 4.58 | −0.04 | −1 | 1.00 | 62.61 | −0.03 | 0.81 | 0.81 | 32.81 |
| MoW-5 | 1.6 | 4.44 | −0.03 | −0.89 | 0.89 | 61.8 | −0.1 | 1.98 | 1.98 | 33.76 |
| Niobium | 2.77 | 4.48 | 0.18 | −1.17 | 1.18 | 62.03 | 1.62 | 2.24 | 2.76 | 33.49 |
| Platinum | 2.13 | 5.42 | −0.1 | −1.04 | 1.04 | 67.75 | −0.62 | −1.4 | 1.53 | 26.83 |
| Rhenium | 1.68 | 4.63 | −0.09 | −0.76 | 0.77 | 62.94 | 0.76 | 4.22 | 4.29 | 32.43 |
| Tantalum | 1.89 | 4.45 | −0.06 | −0.98 | 0.98 | 61.83 | −0.17 | −0.14 | 0.22 | 33.73 |
| Titanium | 3.93 | 4.99 | −0.22 | −1.13 | 1.15 | 65.07 | −1.31 | −0.85 | 1.56 | 29.94 |
| Tungsten | 1.71 | 4.45 | −0.04 | −1.01 | 1.01 | 61.87 | −0.33 | 0.8 | 0.87 | 33.67 |
| Vanadium | 2.08 | 4.5 | 0.38 | −1.24 | 1.30 | 61.16 | 2.01 | 3.11 | 3.70 | 33.34 |

In an alternative example to minimize the reflectance of a surface (e.g., any surface of the first and second substrates 22, 26), a texture or roughness may be introduced to the optical interface between the two media. The feature dimensions of the texture may be in the order of magnitude of the light wavelength, such as in an anti-glare or moth-eye anti-reflection surface. Combining an anti-glare texturized surface with a metal-based antireflection coating (e.g., the optical coating 80) may be advantageous in reducing the reflectance of the interface to levels lower than that exhibited by the texturized surface or a metal-based antireflection coating alone. The features of the textured or roughened surface may have a dimension of between about 0.1 μm and about 20 μm. A haze of the textured or roughened surface may be less than about 50%, less than about 30% or less than about 10%.

When coatings are used in applications where the coating is reflecting or transmitting a color image, it is important that the color rendering of the image is correct. Under some As shown in Tables 1, 2 and FIG. 7, some of the examples of materials for the optical coating 80 may have reflectance values greater than zero for their optimal antireflection situation. It is not uncommon for antireflective coatings to have some positive value of reflection as it can be challenging to antireflect over a broad wavelength range. In some examples, the optical coating 80 can be further improved by the addition of a thin dielectric, insulator or transparent conducting oxide layer positioned between the substrate (e.g., the second substrate 26) and the material of the optical coating 80. Table 3 below shows the benefits attainable for metal examples (e.g., chromium) of the optical coating 80 using thin film models. As can be seen, the reflectance is reduced substantially with the addition of the dielectric layer. The desired thickness and refractive index of this dielectric layer will vary with the material of the optical coating 80 and the requirements of the application. The refractive index of the dielectric layer may be less than about 2.4, less than about 2.0. The thickness may be less than 50 nm, or less than 35 nm.

TABLE 3

| Sample | Dielectric RI | Dielectric Thickness | Cr Thickness (nm) | Reflectance Y | a* | b* | Transmittance Y | a* | b* |
|---|---|---|---|---|---|---|---|---|---|
| 1 | — | — | 1.56 | 4.66 | −0.33 | −3.71 | 65.50 | 0.61 | −3.45 |
| 2 | 1.6 | 32.73 | 1.63 | 4.59 | −0.23 | −3.81 | 64.69 | 0.62 | −3.55 |
| 3 | 1.7 | 31.51 | 1.87 | 4.40 | 0.16 | −3.83 | 61.92 | 0.69 | −3.94 |
| 4 | 1.8 | 22.42 | 2.04 | 4.28 | 0.51 | −3.55 | 60.12 | 0.72 | −4.22 |
| 5 | 1.9 | 22.90 | 2.13 | 4.23 | 0.73 | −3.07 | 59.25 | 0.73 | −4.40 |

Figure 9:
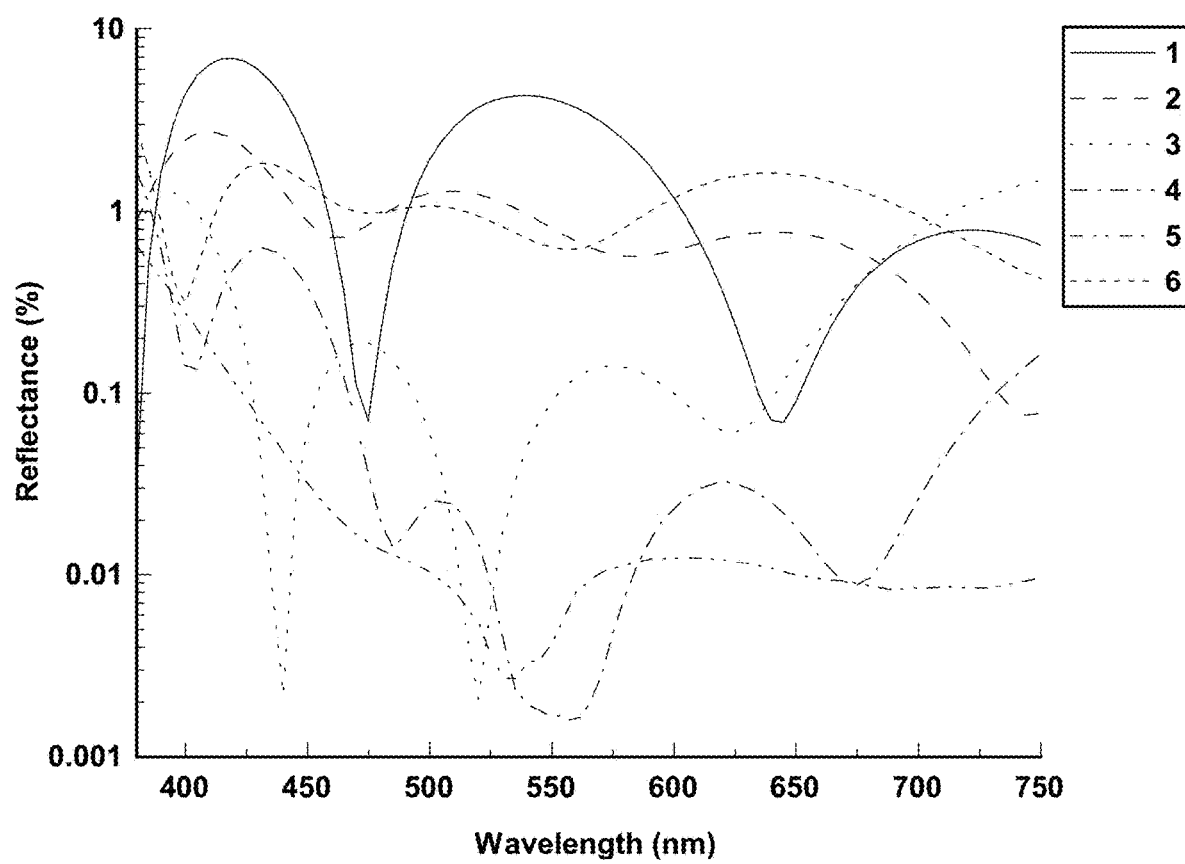
FIG. 9 illustrates a graph of reflectance vs. wavelength for different optical coatings.

Unexpectedly, the use of the optical coating 80 can be used in conjunction with a relatively thick transparent conductive oxide (TCO) layer such as indium tin oxide (ITO) to create a low reflectance transparent electrode suitable for use in electro-optic devices such as a HUD combiner for the heads-up display system 14. Table 4 below shows the reflectance of an ITO layer which is 370 nm thick. The reflectance off the coated surface is 2.9%. In the examples in Table 4, the ITO and other coatings are on the rearward surface of a glass substrate and an electrochromic material with a refractive index of about 1.44 is used as an exit media. The reflectance from the first surface is omitted. The addition of a thin tantalum layer as an example of the optical coating 80 onto the ITO layer drops the reflectance to about ⅓ of its initial level. It will be understood that although results utilizing tantalum are provided, other compounds from Table 1 and elsewhere herein may be used with comparable results. The thickness of the TCO or ITO may be about 10 nm, about 100 nm, 150 nm, 250 nm or 350 nm and all values therebetween. The third example in Table 4 includes an additional color suppression (CS) layer positioned between the substrate and the ITO layer. In this case, the reflectance drops to less than about 0.1%. The CS layer may have a refractive index of between about 1.6 to about 1.75, or between about 1.63 and 1.71. The example provided in Table 4 had an index of 1.67 for the CS layer. The thickness of the CS is approximately a quarter-wave optical thickness for a design wavelength between about 450 and 600 nm. Alternatively, the CS layer may be a bi-layer including a high and low index material, known as a Herpin equivalent index layer, whose net index and optical thickness matches the requirements listed above. The fourth example in Table 4 includes a Herpin equivalent CS layer composed of a bilayer of $Nb_2O_5$ and $SiO_2$ with a thin Molybdenum top layer. The reflectance drops to under 0.1% and the sheet resistance is under 4 ohms/sq. The fifth example shares the same material stack as the fourth example, with the main difference of having a much thinner ITO layer, demonstrating the control in the sheet resistance and also a reflectance under 0.1%. The sixth example demonstrates that one can obtain higher transmission by using a different metal thin layer on top of the ITO, while keeping the reflectance under 1%. Alternate CS layers include, but are not limited to, dual quarter wave stacks wherein the optical thickness of each layer is approximately a quarterwave optical thickness and the refractive indices are intermediate the refractive index of the glass and TCO. In another embodiment, the CS layer may be a graded index layer wherein the refractive index approximately matches the refractive index of the substrate at the substrate/CS interface and approximately matches the index of the TCO at the CS/TCO interface and the refractive index gradually changes throughout the thickness of the CS. In yet another example, the CS layer may be a digitized graded index layer wherein the graded index is achieved by thin alternating layers of high and low refractive index materials. The reflectance spectra for the examples in Table 4 are shown in FIG. 9. It will be understood that other intermediate layers may be present or used and that some optimization may be desired to balance different design goals. It will be understood that R (%) and T (%) in Table 4 represent percent reflectance and percent transmittance, respectively.

TABLE 4

| Example | Material stack | R(%) 2nd surface viewed from front | T(%) | R(%) 2nd surface viewed from back | Thicknesses (nm) | Sheet resistance (Ohm/sq) |
|---|---|---|---|---|---|---|
| 1 | ITO | 2.90 | 92.77 | 3.00 | 370 | 4.2 |
| 2 | ITO/Ta | 0.87 | 74.86 | 6.47 | 370/1.6 | 4.2 |
| 3 | CS/ITO/Ta | 0.09 | 75.44 | 4.74 | 82/370/1.6 | 4.2 |
| 4 | Nb₂O₅/SiO₂/ITO/Mo | 0.02 | 73.45 | 4.44 | 9/32/432/1.3 | 3.6 |
| 5 | Nb₂O₅/SiO₂/ITO/Mo | 0.01 | 85.24 | 2.97 | 7/43/20/0.8 | 77 |
| 6 | Nb₂O₅/SiO₂/ITO/Cu | 0.94 | 87.11 | 2.35 | 9/29/432/1.6 | 3.6 |

Figure 10:
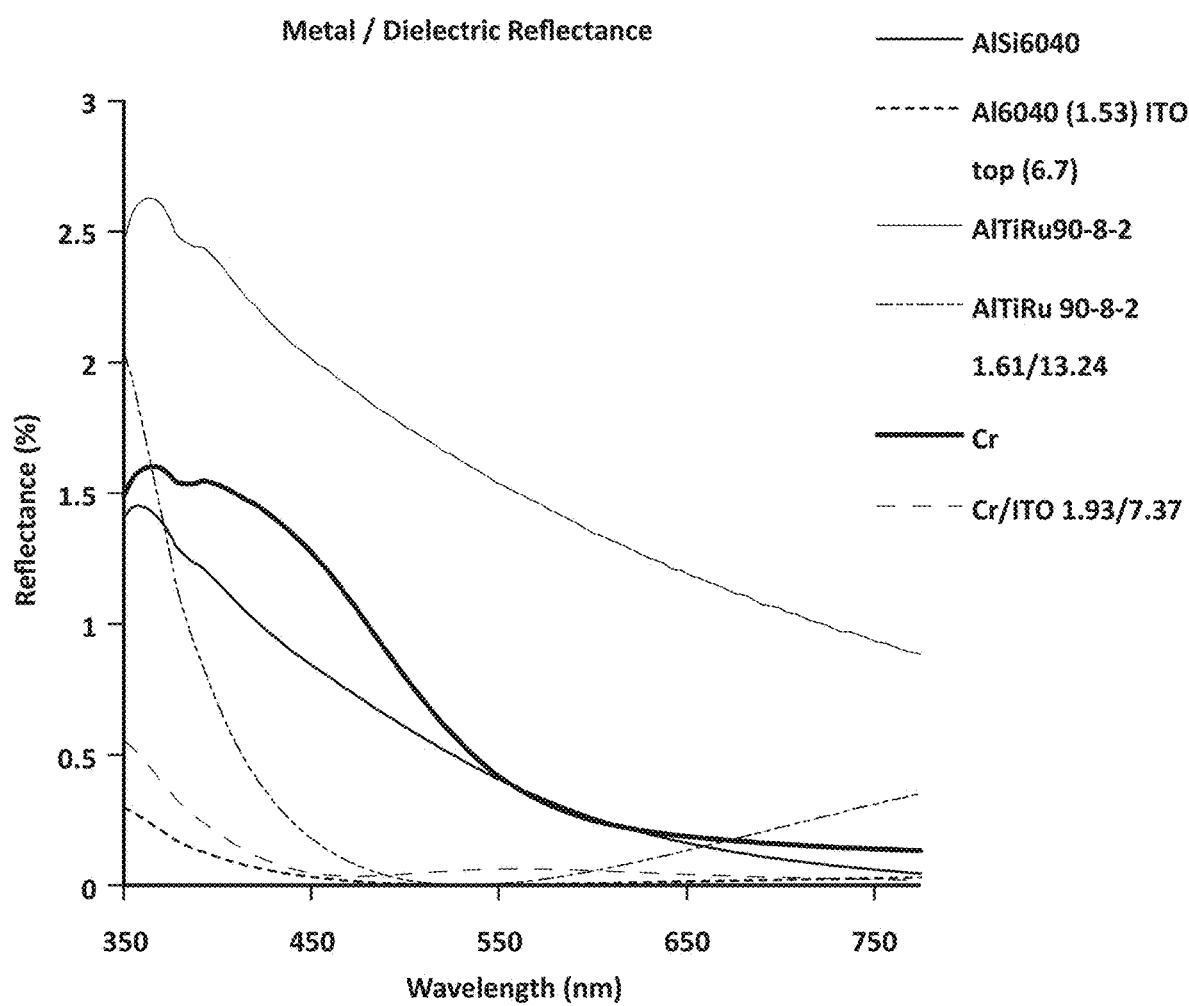
FIG. 10 is a graph of reflectance vs. wavelength for several metal/dielectric optical coatings.

Alternatively, the reflectance of the optical coating 80 can be reduced by the addition of a dielectric, an insulator or transparent conducting oxide layer positioned above a metal layer of the optical coating 80. Table 5 shows the change in reflectance with the addition of an ITO layer above a relatively poorly antireflecting metal. Additionally, a structure with metal and ITO layers both above and below it are shown. The change in the reflectance spectra for the metal alone and with dielectric layer or layers are shown in FIG. 10 for select examples. The intensity of the reflectance is decreased across the plotted spectra. The thickness of the dielectric layer in this example is less than about 25 nm and or may be less than about 18 nm.

TABLE 5

| Material | Reflectance (2nd Surface Interface Only) | Transmittance | Reflectance from Reverse Side | Thicknesses (nm) |
|---|---|---|---|---|
| Glass/AlSi6040/ITO | 0.00 | 66.67 | 10.58 | 1.53/6.7 |
| Glass/AlTiRu 90-8-2/ITO | 0.03 | 70.27 | 8.40 | 1.61/13.24 |
| Glass/AlSi8020/ITO | 0.08 | 73.38 | 6.80 | 2.32/16.37 |
| Glass/Cr/ITO | 0.05 | 64.55 | 11.20 | 1.93/7.37 |
| Glass/ITO/Cr 5% air/ITO | 0.03 | 64.05 | 11.86 | 2.69/1.26/1.58 |

Figure 11:
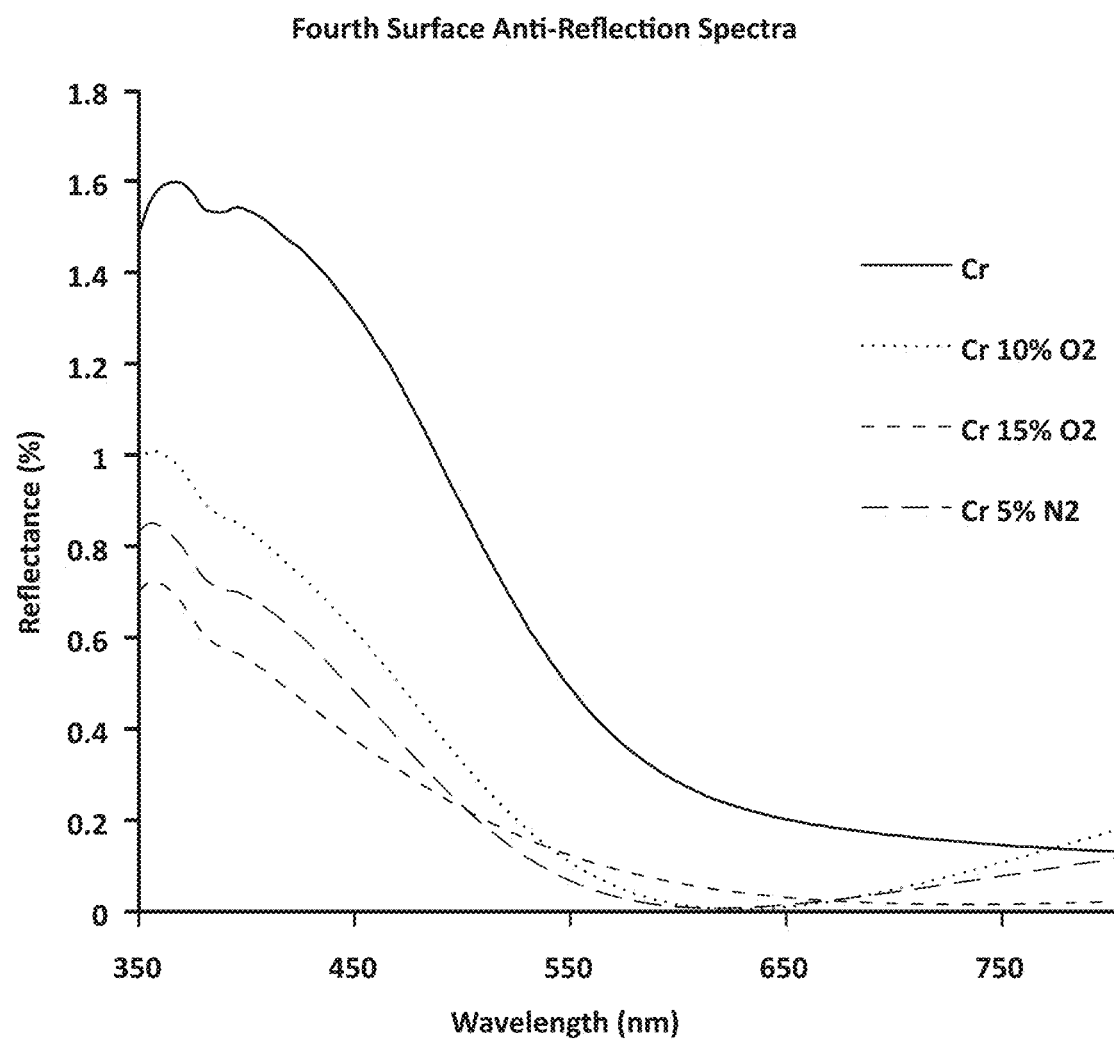
FIG. 11 is a graph of the fourth surface antireflection spectra.

The reflectance of the metal or dielectric metal stacks of the optical coating 80 may be further reduced by the modification of the refractive indices of the metal layers. This can be accomplished by the addition of small dopants or additives to the metals such as nitrogen, oxygen, both or other elements. For example, a chromium layer was sputtered with 5% oxygen and 5% nitrogen and the reflectance of the coated surface was 0.10% for both cases. Other levels of gasses may be used in the sputtering atmosphere to change the optical properties of the metals. The percentages of the dopant gas sources can be varied experimentally to optimize the reflectance as needed. The refractive index relationship described above can be used to guide the optimization of the materials for the desired antireflection properties. Additional examples are shown in Table 6. The reflectance of an un-doped chromium antireflection layer example of the optical coating 80 is approximately 0.54% (eye-weighted). When dopants are added the reflectance drops to less than about 0.15%. The change in reflectance follows the rules for n and the nk ratio, as explained above. As shown in Table 6, the doped chrome n and nk values approach a more preferred state as shown in the contour plot of FIG. 6. The reflectance spectra for several examples in Table 6 are shown in FIG. 11. The addition of a small amount of dopants may reduce the overall reflectance across the plotted spectrum.

TABLE 6

| Material | Combined 1st and 2nd Surface Reflectance Y optimized | Reflectance (2nd surface only) | Transmittance (2nd surface interface only) | Reflectance (from rearward direction) | Thickness (nm) | n '@ 550 nm | k '@ 550 nm | nk ratio |
|---|---|---|---|---|---|---|---|---|
| Cr | — | 0.54 | 68.58 | 10.72 | 1.54 | 2.96 | 4.28 | 0.69 |
| Cr 5% Air | — | 0.11 | 65.96 | 11.32 | 1.15 | 4.13 | 4.67 | 0.88 |
| Cr 15% Air | 4.28 | 0.14 | 66.10 | 11.29 | 1.32 | 3.75 | 4.40 | 0.85 |
| Cr 5% O2 | — | 0.10 | 64.92 | 11.67 | 1.04 | 4.52 | 4.95 | 0.91 |
| Cr 10% O2 | 4.30 | 0.15 | 66.18 | 11.27 | 0.93 | 4.48 | 5.25 | 0.85 |
| Cr 5% N2 | — | 0.10 | 65.91 | 11.33 | 1.17 | 4.12 | 4.60 | 0.90 |

The modeled structures of FIG. 11 and Table 6 are for the case where the metal is positioned on a substrate and has air as an exit media. The role of the exit media was examined and Table 7 shows that low reflectance can be obtained when the exit media refractive index is increased. For example, the exit media could be a liquid fluid or solid material rather than air or gas.

TABLE 7

| Material | Reflectance (2nd surface only) | Transmittance (2nd surface interface only) | Reflectance (from rearward direction) | Thickness (nm) |
|---|---|---|---|---|
| W 1.1 exit | 0.04 | 72.20 | 7.36 | 1.84 |
| W 1.2 exit | 0.02 | 78.68 | 4.22 | 1.39 |
| W 1.3 exit | 0.01 | 85.12 | 1.95 | 0.95 |
| W 1.4 exit | 0.00 | 91.48 | 0.55 | 0.51 |

Figure 12:
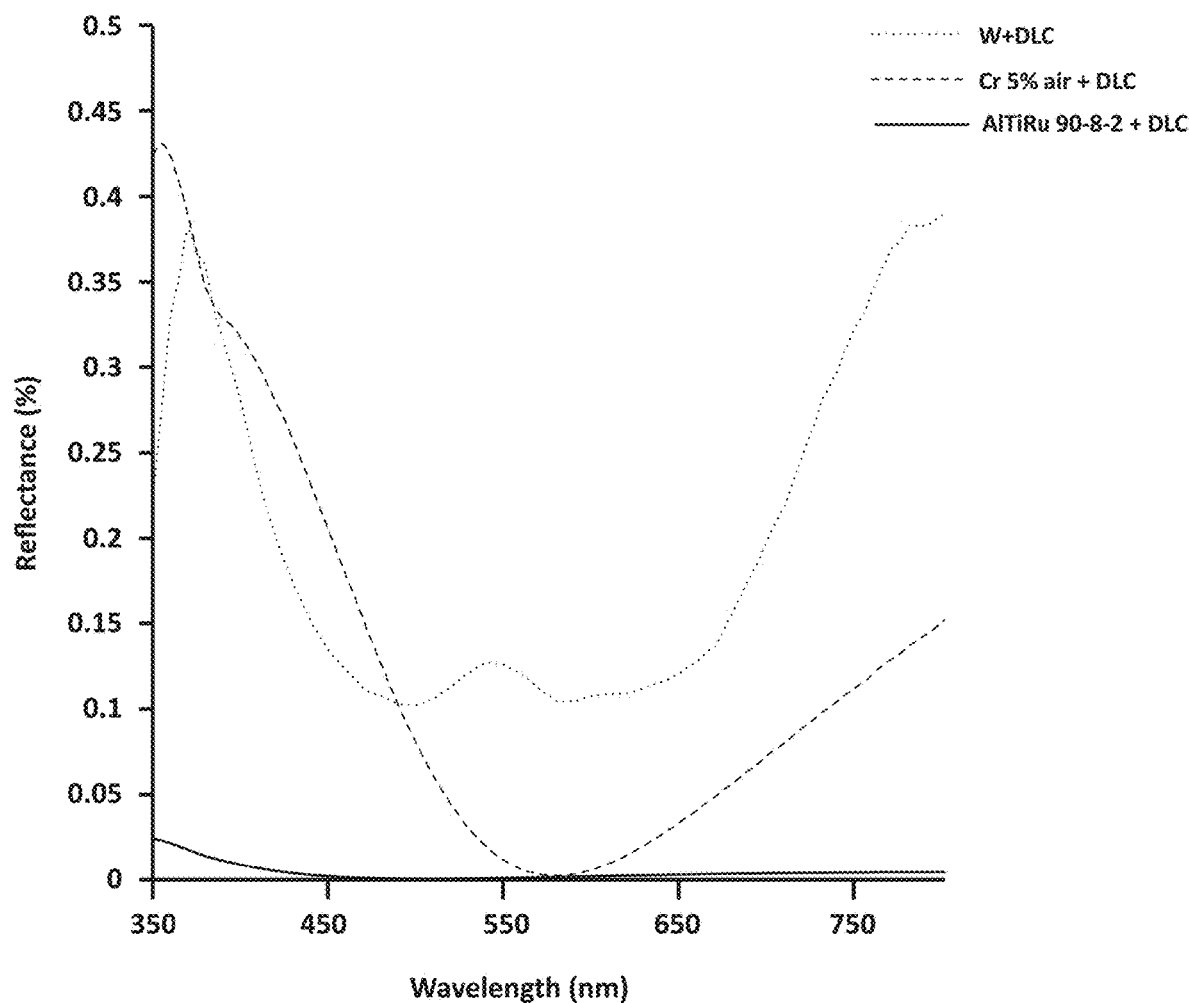
FIG. 12 is a graph of reflectance vs. wavelength for several metal/diamond-like carbon optical coatings.

The optical coating 80, on the fourth surface 26B, may acquire a buildup of environmental contaminants or dirt which is common in an automotive interior. The optical coating 80 may therefore be subjected to regular cleaning to have the best images possible. If the optical coating 80 is not durable then it may be scratched or otherwise damaged by the cleaning solvents or methods. Accordingly, it may be advantageous for the optical coating 80 to be durable. If additional durability is needed for the optical coating 80, the scratch-resistant coating 90 may be added to the optical coating 80. According to one example, the scratch-resistant coating 90 may be a diamond-like carbon (DLC) layer. Since the DLC layer typically has a relatively high refractive index, the layers of the optical coatings 80 may need to be optimized or adjusted to attain the desired balance between reflectance and durability. Table 8 shows reflectance for several thin metal examples of the optical coating 80 with a DLC overcoat example of the scratch-resistant coating 90. The reflectance spectra for select metals with DLC overcoats are shown in FIG. 12.

TABLE 8

| Material | Reflectance (back surface) | Transmittance | Back Reflectance | Thicknesses (nm) |
|---|---|---|---|---|
| W + DLC | 0.12 | 66.36 | 11.17 | 2.11/0.5 |
| Cr 5% air + DLC | 0.03 | 65.01 | 11.57 | 1.1/1.0 |
| AlTiRu 90-8-2 + DLC | 0.00 | 66.59 | 10.62 | 0.97/5.0 |

Equivalence Layer Optical Coatings

As explained above, an optical coating 80 with an equivalent reflectivity as the fourth surface 26B of the second substrate 26, but a lower transmission, may be known as an equivalence layer. The optical coating 80 will continue to have a reduced transmittance as its thickness increases. As shown in FIG. 8, the reflectance will increase past a minimum and, at some thickness, will be essentially equivalent to the reflectance of the fourth surface 26B of the second substrate 26. The thickness and subsequent transmittance at this equivalence point will be dependent on the material or metal (e.g., the metal layer of the optical coating 80) and/or additional layers (e.g., dielectric, insulator or transparent conducting oxide layers and scratch-resistant coatings 90). As the thickness of the optical coating 80 is further increased, the reflectance will be higher than that of the second substrate 26. This equivalence point introduces unique attributes to the optical coating 80 which may be utilized. At the equivalence point, the reflectance of the surface (e.g., the fourth surface 26B) of the substrate (e.g., the second substrate 26) may be essentially equivalent to the uncoated substrate while having a lower transmittance. As explained above, the absolute reflectance of the coated substrate, viewed from the side opposite the coating, should be within the reflectance of the uncoated substrate by less than about 10%, 5%, 2.5%, 1% (absolute) and the transmittance of the coated substrate may be reduced by more than about 20%, 35%, 50%, 60% relative to the uncoated substrate.

A similar analysis to the reflectance was performed wherein the thickness of the optical coating 80 was optimized so that the reflectance from the substrate side matches that of the uncoated substrate (e.g., glass). Table 9 shows a series of metals, alloys and elements which were optimized to match the reflectance of the uncoated glass substrate. In this example, the transmittance was calculated to determine the amount of transmittance that would be possible for different metal constituents of the optical coating 80. A light attenuation factor is the square of the transmittance of the coated glass since the light will pass through the coating twice (i.e., from the third surface 26A, through the optical coating 80, incident on an object, back through the coating 80, and back through the third surface 26A). Therefore, a 60% transmittance coated glass will have an attenuation factor of about 36% while a 50% transmittance coated glass will have an attenuation factor of about 25%. The light attenuation factor for the coating 80 may be less than about 50%, less than 35 or less than about 20%.

TABLE 9

| Material | n | k | nk ratio | Transmittance | Attenuation Factor | Thickness (nm) |
|---|---|---|---|---|---|---|
| AlSi6040 | 3.13 | 4.49 | 0.70 | 43.10 | 19% | 3.45 |
| AlSi8020 | 1.56 | 4.51 | 0.35 | 62.35 | 39% | 2.80 |
| AlSi8515 | 1.29 | 4.67 | 0.28 | 69.00 | 48% | 2.26 |
| AlSi9010 | 1.24 | 4.94 | 0.25 | 71.40 | 51% | 1.92 |
| AlTi5050 | 2.54 | 2.96 | 0.86 | 40.74 | 17% | 7.10 |
| AlTi7030 | 2.88 | 3.39 | 0.85 | 40.59 | 16% | 5.48 |
| AlTiRu90-8-2 | 2.28 | 5.12 | 0.45 | 54.19 | 29% | 2.52 |
| Cadmium | 1.04 | 4.06 | 0.26 | 71.62 | 51% | 2.74 |
| Cr 10% $O_2$ | 4.48 | 5.25 | 0.85 | 40.57 | 16% | 2.36 |
| Cr 15% Air | 3.75 | 4.40 | 0.85 | 40.42 | 16% | 3.32 |
| Cu | 0.95 | 2.58 | 0.37 | 71.72 | 51% | 5.46 |
| CuSn5050 | 1.87 | 4.13 | 0.45 | 54.40 | 30% | 3.76 |
| CuZn | 0.59 | 2.85 | 0.21 | 78.58 | 62% | 3.82 |
| Ge | 4.62 | 2.09 | 2.21 | 49.05 | 24% | 4.90 |
| Ir | 2.23 | 4.31 | 0.52 | 50.29 | 25% | 3.68 |
| Mo | 3.78 | 3.52 | 1.07 | 39.56 | 16% | 4.37 |
| MoRe | 4.92 | 4.88 | 1.01 | 39.38 | 16% | 2.37 |
| MoRe-8 | 3.95 | 4.10 | 0.96 | 39.57 | 16% | 3.53 |
| $MoSi_2$ | 4.67 | 2.33 | 2.00 | 48.06 | 23% | 3.64 |
| MoTa-1 | 3.49 | 3.61 | 0.97 | 39.60 | 16% | 4.48 |
| MoTa-10 | 3.84 | 4.08 | 0.94 | 39.62 | 16% | 3.61 |
| MoTa-4 | 2.96 | 3.37 | 0.88 | 40.25 | 16% | 5.48 |
| MoW-1 | 3.64 | 3.84 | 0.95 | 39.62 | 16% | 4.02 |
| $Ni_2Si$ | 1.95 | 2.23 | 0.87 | 41.40 | 17% | 11.82 |
| Ni | 2.92 | 2.87 | 1.02 | 50.10 | 25% | 6.07 |
| Palladium | 1.64 | 3.85 | 0.43 | 56.97 | 32% | 4.12 |
| Platinum | 2.13 | 3.71 | 0.57 | 48.15 | 23% | 4.87 |
| Rhenium | 4.25 | 3.06 | 1.39 | 40.84 | 17% | 4.12 |
| Rhodium | 2.08 | 4.54 | 0.46 | 53.83 | 29% | 3.16 |
| Ru | 3.28 | 5.46 | 0.60 | 45.58 | 21% | 2.40 |
| Stainless Steel | 2.44 | 3.61 | 0.68 | 44.22 | 20% | 5.20 |
| Ta | 3.54 | 3.48 | 1.02 | 39.50 | 16% | 4.60 |
| W | 3.65 | 3.71 | 0.98 | 39.97 | 16% | 5.80 |
| V | 3.68 | 3.01 | 1.22 | 39.69 | 16% | 5.20 |
| Zn CRC | 1.01 | 4.31 | 0.23 | 69.24 | 48% | 2.69 |
| Zr CRC | 1.82 | 0.95 | 1.92 | 42.00 | 18% | 29.87 |

Figure 13:
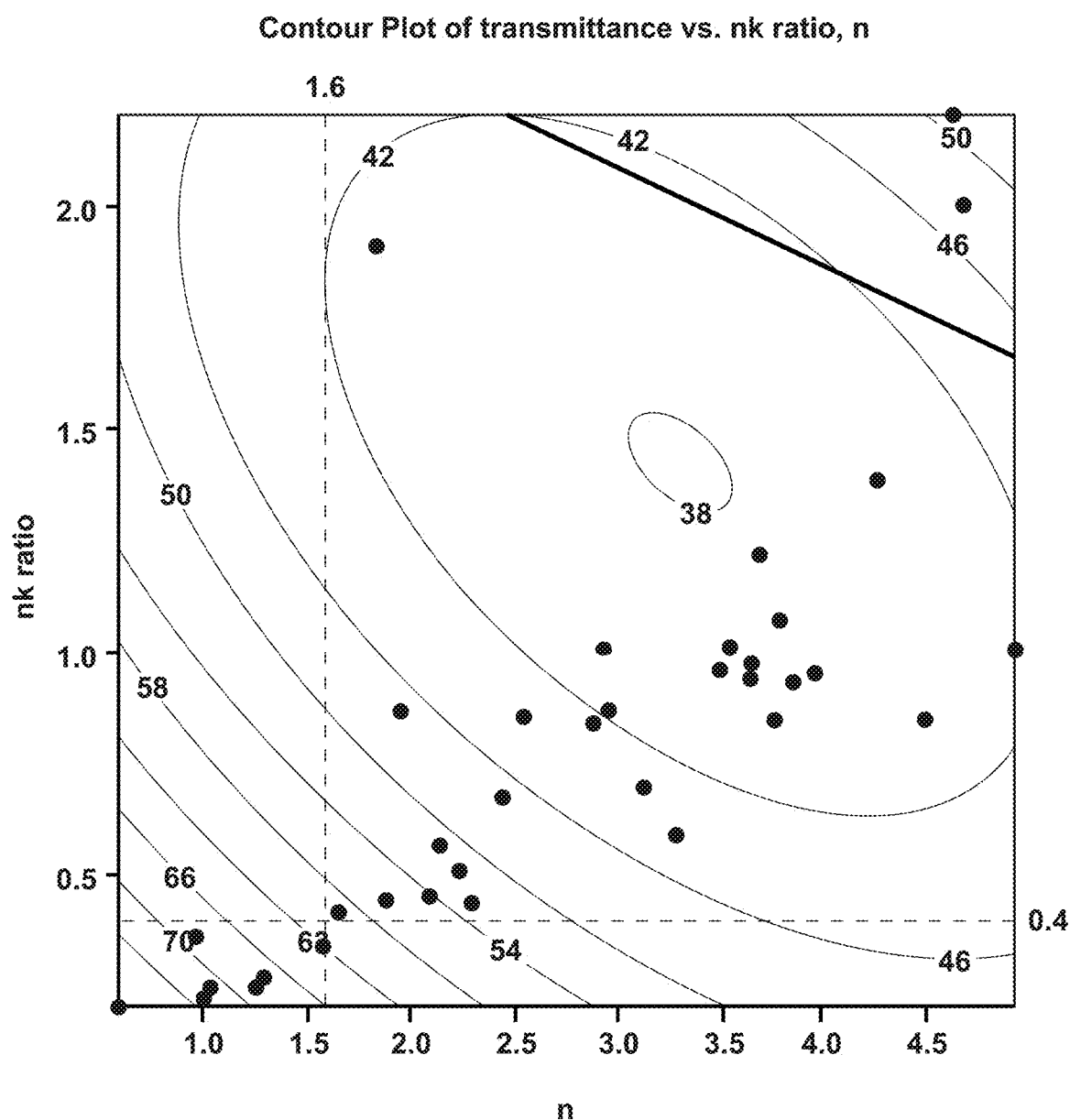
FIG. 13 is a contour plot of transmittance for nk ratio vs. n.

FIG. 13 shows the transmittance at perfect equivalence for the coated and uncoated substrates with respect to the n vs nk ratio. As can be seen, the refractive index of the equivalence coating may have a real part of the refractive index, n, which is greater than about 1.3, 1.5, 1.75, 2.0, 2.5, 3.0 or 3.5 with a nk ratio of greater than about 0.15, 0.3, 0.6, 1.0, 1.5 or 2.0. In a specific example, n may be greater than about 1.6 and the nk ratio may be greater than about 0.4 for a transmittance less than about 60% and an attenuation factor of less than 36%. In another example, n may be greater than 1.8 and the nk ratio may be greater than about 0.6 for a transmittance less than about 53% and an attenuation factor of less than 28%. In yet another example, n is greater than about 2.5 and the nk ratio is greater than about 0.75 for a transmittance less than about 45% and an attenuation factor of less than 20%.

Figure 14:
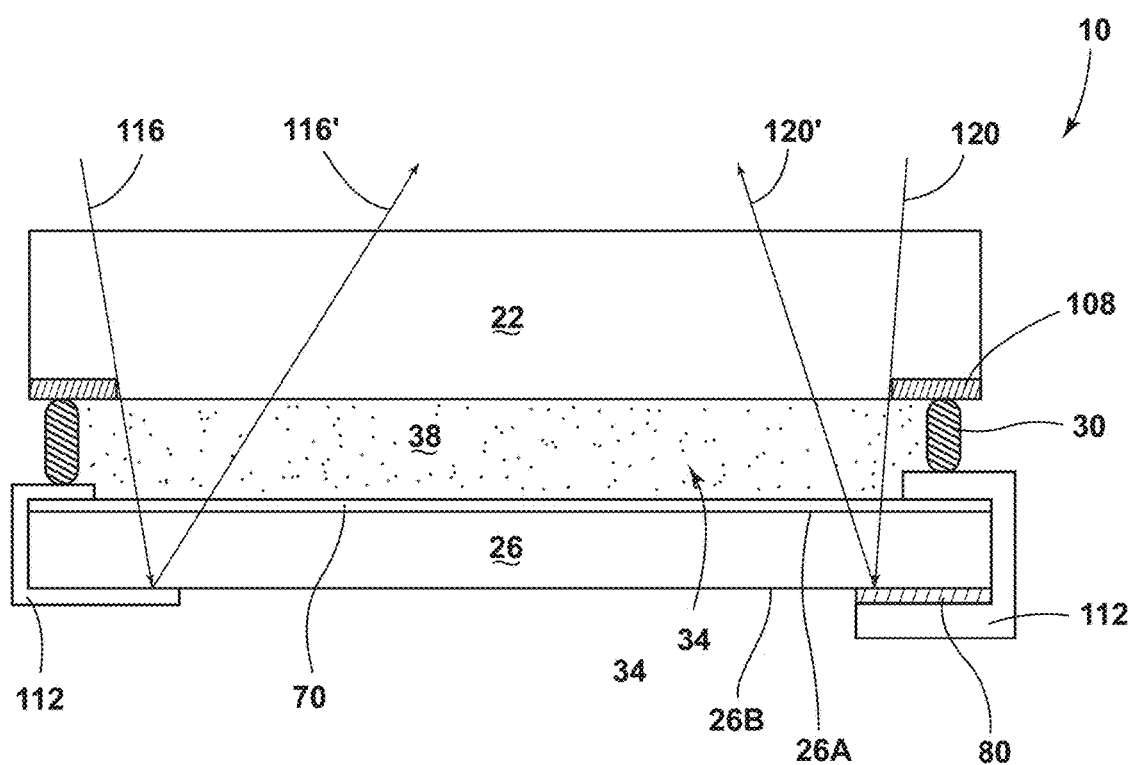
FIG. 14 is a cross-sectional view of an electro-optic element, according to one example.

Referring now to FIG. 14, depicted is an example of the electro-optic assembly 10 utilizing an equivalence layer example of the optical coating 80. The first substrate 22 has a perimeter spectral ring 108 designed with low transmittance to hide the seal 30. The second substrate 26 is bonded to the first substrate 22 with the seal 30 to create a chamber which is filled with the electro-optic medium 38. The second substrate 26 has disposed on it the transflective coating 70.

An electrical connection to the electro-optic medium 38 is attained by J-clips 112 which wrap around the edge of the second substrate 26 to allow connection between the third and fourth surfaces 26A, 26B. The optical coating 80 is positioned on the fourth surface 26B between one of the J-clips 112 and the second substrate 26. A first light beam 116 is depicted as incident on the electro-optic assembly 10 and passing through the first and second substrates 22, 26. The first light beam 116 reflects off the J-clip 112 and again passes through the first and second substrates 22, 26 to leave a first reflected beam 116'. Because the transflective coating 70 is transflective, there can be substantial reflectance from the J-clip 112 which will then be visible as the first reflected beam 116'. A second light beam 120 is also incident on the electro-optic assembly 10, but passes through the equivalence layer example of the optical coating 80. As the reflectance of equivalence layer example of the optical coating 80 is designed to match the reflectance of the uncoated portion of the fourth surface 26B, there will be no increase in light intensity of the second reflected beam 120'. The intensity of the second light beam 120 will be reduced as it passes through the optical coating 80. It will then reflect off J-clip 112 and pass again through the optical coating 80. Finally, the second reflected light beam 120' will emerge from the electro-optic assembly with substantially reduced intensity compared to the first reflected beam 116' which does not pass through the optical coating 80. In the depicted example, the optical coating 80 is a chrome layer with an approximate thickness of about 3.8 nm and has a reflectance approximately equal to the reflectance of the further surface 26B. At this thickness, the transmittance through the optical coating 80 is approximately 44%. The net attenuation factor of the second light beam 120 and the second reflected light beam 120' passing through this layer twice is the product of 44% times 44% which is approximately 20%. The intensity of the reflectance off the J-clip 112 is therefore reduced by a factor of 5 from its original value. The level of the attenuation factor needed will depend on a given application, in particular on the reflectivity of the rearward components and the lighting conditions under which the electro-optic assembly 10 is being viewed.

Examples of materials, metallic elements and alloys suitable for the equivalence coating would be a single or multi-layer of a metallic material such as those elements and alloys shown in the table above or alloys containing these elements which have a transmittance of less than about 60%. The thickness of the metal layers may be between about 1 and about 20 nm, between about 1 and about 9 nm, or between about 3 and about 8 nm. Similarly to the use of thin materials or metallic layers for antireflection properties, the equivalence coating may include the metals and/or alloys listed above along with additional insulator, dielectric, TCO, DLC or other metals configured to meet the reflectance and light attenuation objectives.

Use of the present disclosure may offer a variety of advantages. First, the optical coating 80 of the disclosure may be used as both an antireflective coating as well as a coating to decrease transmission. Use of the same material for two purposes may decrease manufacturing costs associated with the electro-optic assembly 10. Second, as the optical coating 80 has substantially the same reflection as an uncoated substrate, the optical coating 80 may go unnoticed, or have a "stealthy" appearance, when viewed by a person. For example, a discernible change in the reflectivity of the fourth surface 26B of the second substrate 26 may not be noticed by a viewer, only the decreased transmission. In other words, the optical coating 80 may not substantially affect (e.g., ±about 10%) the reflectivity of the fourth surface 26B. Third, the optical coating 80, as described herein, may be applied to a wide variety of transparencies as explained above.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A transparency, comprising:
  a first substrate comprising a first surface and a second surface;

a second substrate comprising a third surface and a fourth surface;

an optical coating positioned on the fourth surface, the optical coating having a refractive index of greater than about 1.8 and an nk ratio of greater than about 0.6, and comprising at least one metal or metal alloy selected from aluminum silicon alloys, aluminum titanium alloys, molybdenum, molybdenum rhenium alloys, molybdenum silicon alloys, niobium, cobalt, iridium, platinum, rhenium, ruthenium, stainless steel, tantalum, tungsten, vanadium, and zirconium, and wherein the reflectance of the fourth surface has a reflectance of less than about 1.2% as measured from the first surface.

2. The transparency of claim 1, wherein the optical coating is configured to have a reflectance of less than about 0.5% and a refractive index real component n greater than about 2.5 and an nk ratio between about 0.6 and about 2.0, as measured at 550 nm.

3. The transparency of claim 1, wherein the optical coating is configured to have a transmittance through the coated surface of less than about 80%.

4. The transparency of claim 1, wherein the reflectance is selected from at least one of an eye-weighted reflectance, an average reflectance over the visible light spectrum, and a narrow wavelength band.

5. The transparency of claim 1, further comprising:
a diamond-like carbon coating positioned on the optical coating, wherein the optical coating has a color rendering index greater than about 85 for at least one of transmittance and reflectance.

6. The transparency of claim 1, wherein the first substrate and the second substrate are configured to be held in a parallel spaced-apart relationship and sealed around a perimeter of the first and second substrates; and
an electro-optic medium is positioned between the second surface of the first substrate and the third surface of the second substrate.

7. The transparency of claim 6, wherein the electro-optic assembly is configured to reflect an image from a projector of a heads-up display system of a vehicle.

8. The transparency of claim 1, wherein a thickness of the optical coating is between about 1.5 nm and 15 nm.

9. The transparency of claim 1, wherein the optical coating comprises a thickness of from about 0.1 nm to about 5 nm and an eye-weighted reflectance of less than about 9%, as viewed through the second substrate.

10. The transparency of claim 1, wherein the optical coating comprises a reflected color C* value in the CIELAB color system of less than about 10.

11. The transparency of claim 1, further comprising:
a dielectric insulating layer disposed between the optical coating and the second substrate.

12. The transparency of claim 11, wherein the dielectric insulating layer comprises a refractive index real component n of less than about 2.4, as measured at 550 nm.

13. The transparency of claim 11, wherein the dielectric insulating layer has a thickness of less than about 50 nm.

14. The transparency of claim 1, further comprising:
one of a dielectric material, insulator, and a transparent conductive oxide layer disposed on the optical coating, on a side of the optical coating opposite the second substrate.

15. The transparency of claim 1, wherein the optical coating comprises a metal doped with at least one of oxygen and nitrogen.

16. The transparency of claim 1, further comprising:
a first electrode disposed on the second surface and a second electrode disposed on the third surface.

17. The transparency of claim 1, further comprising:
an anti-reflective electrode disposed on the second surface and comprising a color suppression layer disposed proximate the second surface and a transparent conductive oxide disposed between the color suppression layer and the third surface.

18. The transparency of claim 1, wherein the fourth surface comprises a first portion including the optical coating and a second portion that is free of the optical coating.

19. The transparency of claim 18, wherein an absolute reflectance of the first portion is within about 10% of an absolute reflectance of the second portion and a transmittance of the first portion is less than a transmittance of the second portion, as viewed through the second substrate.

20. The transparency of claim 1, wherein the optical coating comprises an aluminum titanium ruthenium alloy.

* * * * *